US010974122B1

(12) United States Patent
 DiPaolo

(10) Patent No.: US 10,974,122 B1
(45) Date of Patent: Apr. 13, 2021

(54) SYSTEM AND METHOD FOR DEVELOPING ATHLETES

(71) Applicant: Donald G. DiPaolo, Detroit, MI (US)

(72) Inventor: Donald G. DiPaolo, Detroit, MI (US)

( * ) Notice: Subject to any disclaimer, the term of this patent is extended or adjusted under 35 U.S.C. 154(b) by 0 days.

(21) Appl. No.: 16/387,530

(22) Filed: Apr. 17, 2019

(51) Int. Cl.
 *A63B 71/06* (2006.01)
 *G09B 19/00* (2006.01)
 *G06F 16/23* (2019.01)

(52) U.S. Cl.
 CPC ...... *A63B 71/0622* (2013.01); *A63B 71/0616* (2013.01); *G06F 16/2379* (2019.01); *G09B 19/00* (2013.01)

(58) Field of Classification Search
 USPC .......................................................... 700/92
 See application file for complete search history.

(56) References Cited

U.S. PATENT DOCUMENTS

| | | | | |
|---|---|---|---|---|
| 2008/0305462 | A1* | 12/2008 | Gluck | A63B 71/0616 434/247 |
| 2015/0017618 | A1* | 1/2015 | Portenga | G09B 7/02 434/236 |

\* cited by examiner

*Primary Examiner* — Pierre E Elisca

(57) ABSTRACT

A system (100) and method (900) for developing an athlete (82) through the exchange of data (400) between a user (80) and the system (100). The system (100) can iteratively prompt users (80) to provide the inputs (410) that the system (100) uses to create the outputs (460) used to develop an athlete (82). The system (100) can utilize a wide range of data (400) relating to different skill areas (550) within different development categories (500).

18 Claims, 60 Drawing Sheets

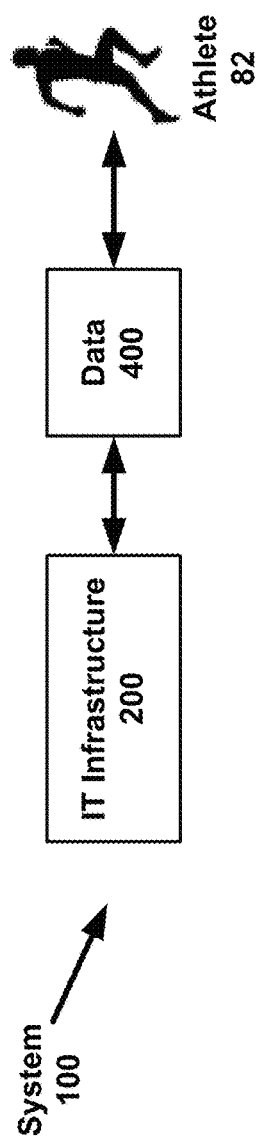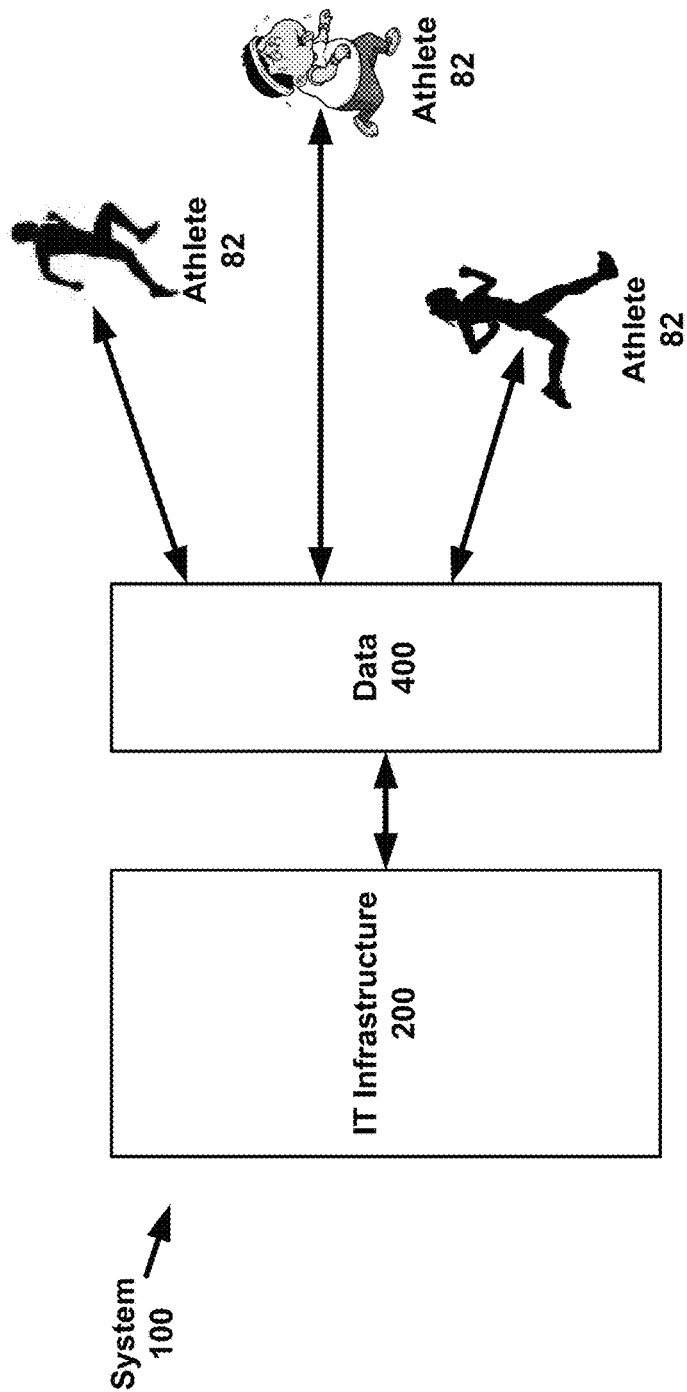

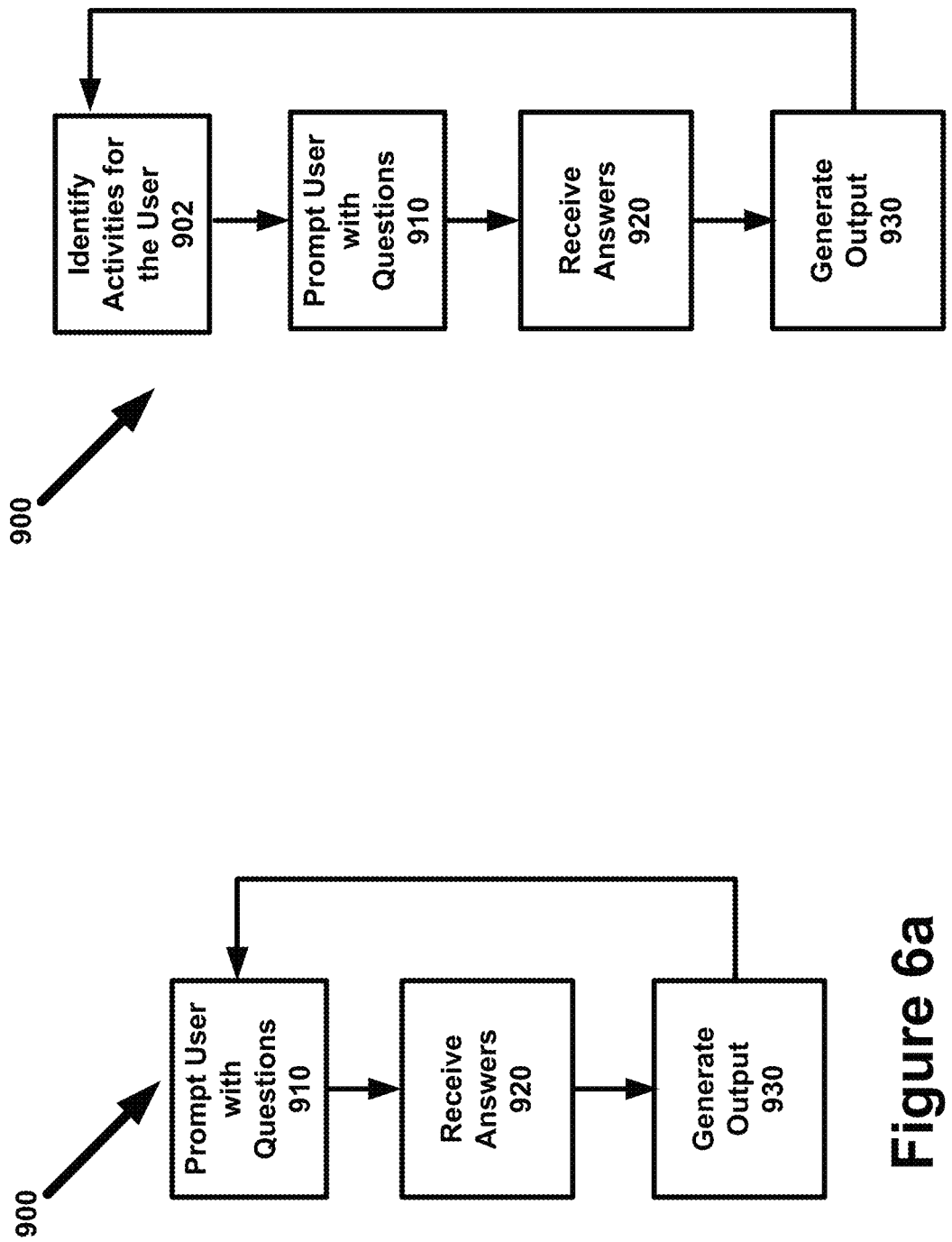

INTRODUCTION

A Message to Athletes

Why do you play sports? Is it to:
- Just have fun?
- Be a part of a successful team?
- Get a college scholarship?
- Play professionally?

The truth is:
There are important areas other than specific athletic skills that determine your success. It can get pretty frustrating when you feel you aren't playing to your potential and your goals won't be achieved. There is little direction designed just for you to help you work on these critical areas.

The Player Development Program is a revolutionary new approach that helps you:
- Build your self-confidence.
- Strengthen your performance focus.
- Make mental discipline a habit.
- Build your self awareness as a person and player.
- Create stronger relationships.
- Practice effective communication skills.
- Expand your leadership awareness and capacity.
- Strengthen your accountability to yourself and others.
- Enhance your role as a team player.

Don't worry!
This looks overwhelming, but it really isn't once you understand:
- It's going to take time to work through the program—and that's OK. Most of sports involves an investment of effort over time.
- Most likely, your coach and teammates will be on this journey with you and will give you plenty of help.
- You won't be doing all of this all at once. You will be picking and choosing the areas to work on first.

CONFIDENTIALITY
- To protect your identity and confidentiality, and to increase the chances that you will give accurate answers, your scores remain your property and yours alone.
- Therefore, NO NAMES should ever be handed in to the coach.
- In order to gather team data, players may be asked to make a copy of page 6 and hand it in.
- These scores can be used in a way that will help you see how your team scored on every question, on each of the nine skill areas, and on the three overarching areas of player development: Performance Psychology, Personal Development, and Team Leadership.

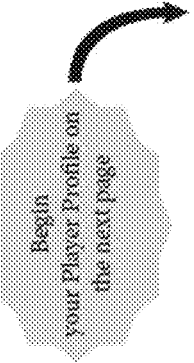

Begin your Player Profile on the next page

Player Profile Summary

There were three (3) Category Totals on page 8. Copy those numbers here and circle the matching rating:

| | | | | |
|---|---|---|---|---|
| My Performance Psychology Score: | ___ | High | Somewhat High | Moderate | Somewhat Low | Low |
| My Personal Development Score: | ___ | High | Somewhat High | Moderate | Somewhat Low | Low |
| My Team Leadership Score: | ___ | High | Somewhat High | Moderate | Somewhat Low | Low |

There were nine (9) Individual Skill Areas on the top of page 7:

* Building Self-Confidence
* Strengthening Performance Focus
* Making Mental Discipline a Habit
* Building Self Awareness
* Creating Strong Relationship
* Practicing Effective Communication Skills
* Expanding Leadership Awareness and Skills
* Strengthening Accountability to Self and Others
* Enhancing My Role as a Team Player Of the 9 skill areas listed above, my three (3) HIGHEST category scores were:

1. Category Title: _____ Score: ___
2. Category Title: _____ Score: ___
3. Category Title: _____ Score: ___

Of the 9 skill areas listed above, my three (3) LOWEST category scores were:

1. Category Title: _____ Score: ___
2. Category Title: _____ Score: ___
3. Category Title: _____ Score: ___

Figure 7i

Performance Psychology Exercises — Building Self-Confidence – Questions #1-3

MANAGE DESTRUCTIVE SELF-CRITICISM: Profile Question #1

THE BARRIER: The Practice of Destructive Self-Criticism

Constructive self-criticism, recognizing your mistakes and learning from them, is an important growth practice. But it's all too easy to fall into the trap of destructive self-criticism; seeing a mistake and replaying it in your head over and over again, silently screaming, "What a loser!" Result: your self-confidence plummets.

THE SOLUTION: Stop the Criticizer

Destructive criticism is just criticism for its own sake. There is no benefit. What is your cost? Your self-confidence. By reducing its practice, your self-confidence is protected.

PDE Player Development Exercises:

1. Begin the day with this command, "Look out for destructive self-criticism!" This will help you notice when it is happening—the first step at correcting it.

2. Stop the Criticizer. The moment you become aware that you're practicing destructive self-criticism, say to yourself, in these words, "Stop it!" Each time the destructive criticism occurs, repeat the command. This practice, while simple, is surprisingly powerful. You will soon find this habit of destructive self-criticism weakening.

PTQ Personal Training Questions:

1. Think back over the past few weeks; list examples of having made a mistake that you responded to with destructive self-criticism.

_____
_____
_____

2. What parts of your game are most vulnerable to destructive self-criticism?

Performance Psychology Service — Building Self-Confidence – Questions #1-3

USE ACCOMPLISHMENTS TO BUILD SELF-CONFIDENCE: Profile Question #2

THE BARRIER: Withholding Credit

You probably don't notice the hundreds of things you do daily that can bring about future success. Our success as athletes happens through numerous small achievements like daily exercise, repeated skills practice, studying the opposition, etc. Most of the time we are the only witness to these critical small accomplishments. Most of the time, we don't even notice.

THE SOLUTION: Recognize Success

Since our many small achievements are the building blocks of our success, it only makes sense to use them as the building blocks of our self-confidence. The fact that they are numerous and we see them all, presents a huge confidence building opportunity.

Player Development Exercise:

1. At the end of every day have a meeting with yourself and review, mentally, all of your achievements, no matter how small, for that day. This brief meeting every day will build the habit of automatically recognizing accomplishments as they occur, and with no effort. It will simply just happen! The benefit: continuous confidence building.

Personal Training Questions:

1. Identify a positive result you accomplished during the last year as an athlete. Break down that result into the many large and small achievements that brought it about. List those achievements below.

_____
_____
_____
_____
_____

2. Review each of these achievements and ask yourself whether you recognized them as achievements while they were happening. If "yes", keep it up! If "no", for the sake of your confidence, start practicing.

Figure 71

Performance Psychology Exercise — Building Self-Confidence — Questions #1-3

SELECT OUT THE POSITIVES: Profile Question #3

THE BARRIER: Selecting Out the Negatives

Our performance in a practice or a game is the sum of numerous activities. The performance of most tasks requires a large number of action steps. For some of us, as long as all of those steps are performed well, we recognize and appreciate them. But if any one of those steps should not go right, then all we see is the mistake. It's as if our achievements never happened. By doing this, we rob ourselves of their confidence building potential!

THE SOLUTION: Select Out the Positives

When you've made a mistake, while it is unwise to pretend that it didn't happen, it is really important to not ignore the many things you did right. In the face of a mistake, intentionally select out the positives.

PDE  Player Development Exercise:

In the face of a mistake, ask yourself the question, "What did I do right?" and demand an answer. By doing this, problems will not be ignored. Most importantly for your self-confidence, you will not have turned your back on your achievements.

PTQ  Personal Training Questions:

1. List some recent examples in which you ignored your good performance because you focused only on your mistakes.

_____
_____
_____
_____

2. To help promote your ability to select out the positives in the face of a mistake, look back at your day for examples of negative performance and list them. Then, for each, list all of the positive activities that happened in addition to the mistake. Note the ratio between the mistakes you made and the things you did right. Remember, you were responsible for both.

Performance Psychology Exercises   Building Self-Confidence – Questions #1-5

ELIMINATE DESTRUCTIVE COMPARING: Profile Question #4

The Barrier: Destructive Comparing

In sports, a player's performance is constantly being judged against the performance of others. It is easy to fall into the trap of evaluating our own performance, not for what it is, but for how it compares to the performance of someone else. This can result in us failing to recognize our achievements and mercilessly eroding our self-confidence.

The Solution: Eliminate Destructive Comparing

We can use the performance of others to establish new goals for ourselves, but when evaluating how we are doing, we must use our potential and past performance as the comparison, not the performance of others.

PDE Player Development Exercise:

1. When evaluating how you did in your last game or practice, ask yourself, "What level of performance should I be expecting from me?" Make sure you compare your performance with your potential, not with someone else's. From that perspective, how did you do?

PTQ Personal Training Questions:

1. Think about a time when you played very well, but didn't get the credit from your coaches, teammates, the press, or parents because others had even better games. How did that make you feel?

_____
_____
_____
_____

2. Looking backwards, can you think of any examples in which you didn't give yourself the credit you deserved, not because your performance was lacking but because it wasn't as good as someone else's? If so, list some examples for future reference.

MANAGE EXTERNAL CRITICISM: Profile Question #5

The Barrier: Overreacting to External Criticism

Being criticized by someone can be a valuable source of learning. However, it can also do severe damage to our level of self-confidence. For many of us, our confidence automatically goes into a tailspin and so the damage to our performance can become greater than the possible benefit of the criticism.

The Solution: Distance the Criticism

This mental habit has two functions. First, it interferes with the automatic over-reaction we often have to an external criticism. Second, it helps us see any potential benefit that might come from the criticism.

Player Development Exercise:

When receiving external criticism, immediately ask yourself and answer these four questions:

1. Do I respect the criticizer? A criticism from someone whose judgment you respect should have significantly greater impact than from someone whose judgment you hold in low regard.
2. Do I care? The negative opinion may be a correct one but it's not in an area that's important to you.
3. Do others agree? If many don't agree with the criticism, it's important to take that into account.
4. Do I agree? When criticized, as honestly as you can, determine if you agree with the criticism or not.

Making a habit of asking these four questions can interfere with the automatic confidence drain that external criticism can have. At the same time, if the criticism has value, you will recognize it.

Personal Training Questions:

1. Just ask yourself this question: Would my getting better at managing external criticism likely make a difference in my level of confidence over the next year?
2. List three criticisms you have received from others in the past that damaged your self-confidence. For each, rate the impact it had on you from 1-10, with 10 being huge.

a. _____
   b. _____
   c. _____

3. If at the time, you would have asked the four player development questions above, how would it have effected the ratings you gave?

Figure 7o

Performance Enhancement Agenda — Strengthening Performance Focus – Questions #6-10

FOCUS ON THE CONTROLLABLE: Profile Question #6

The Barrier: Focusing on Uncontrollables

It is so easy, in the moment, to start thinking about things that may matter to us but that we have no control over, things like, "What's the coach thinking about me right now?" "Did my parents see what I just did?" "Trouble is, when we're focusing on things we don't control, we can't be totally focused on what we do control – our potential.

The Solution: Focus on What You Control – Your Activity

The solution starts with noticing when we're focusing on what we don't control and then getting us back to where we belong — managing our own performance. Because we think very quickly, we can make that shift happen instantly.

Player Development Exercises:

1. At the beginning of a practice or game, remind yourself, "Walk Away from the Uncontrollables!"
2. When you find yourself focusing on something, ask yourself the question, "Do I control this?" If the answer is "No!" order yourself back to where you belong — managing your own performance.

Personal Training Questions:

1. List some things that are important to you or impact you as an athlete over which you do not have direct control.
   a. _____
   b. _____
   c. _____
   d. _____
   e. _____

2. Look at each item on your list and for each, ask yourself, "Do I think about that uncontrollable while I'm performing?" Check off those for which the answer is "yes".

Use the "yes" items as your danger list and work at backing off.

Figure 7p

Performance Enhancing Exercises    Strengthening Performance Focus – Questions #6–10

FIGHT DISTRACTION: Profile Question #7 & #8

The Barrier: Leaving The Moment
Being in the moment during a practice or game allows you to focus in on the immediate situation, see it's opportunities and put your potential to work. Distraction blurs your ability to recognize opportunities and freezes your potential. It takes you out of the moment.

The Solution: Reduce Distractibility
Often distraction just happens and does its performance damage without you even realizing it. Becoming aware of your level of focus and taking control of it can go far in reducing your distractibility.

PDE Player Development Exercises:

1. In a game or practice, during those times when you are not actually performing, ask yourself the question, "What was my level of focus?" and rate yourself between 1 and 10, 10 being completely focused, 1 being totally distracted. This practice will increase your awareness of your level of focus. You'll notice more quickly when you've become distracted.

2. The moment you recognize distraction while performing, just give yourself the internal command, "Focus!" Give that order every time distraction is noticed.

3. Practice the above two exercises in other situations (e.g. during class, while studying, listening to coach's game preparation) to further strengthen your ability to focus.

You should notice a decrease in the amount you take yourself out of the moment in both the number of times and in the duration.

PTQ Personal Training Questions:

1. Review the day and look for any times you went out of focus without noticing. This should help further promote awareness.

2. Thinking about the last year, when did becoming distracted hurt your performance?

Performing Psychology Exercise — Strengthening Performance Focus — Questions #6-10

MAKE FUN AN INTENTIONAL OBJECTIVE: Profile Question #9

The Barrier: Forgetting Where You Are

People involved in competitive sports love the game. Why else would they spend the time, effort and perspiration playing it? Yet it can be all too easy, during competition, to get so caught up in the demands and frustrations of the game that the joy of being there gets lost. They forget to have fun. What a waste! And not only that. To lose the fun is, often, to lose the focus.

The Solution: Capture the Fun

When having fun, it's easy to stay in the moment because it's as if that moment is all there is. Having fun blocks out distractions without you even trying.

PDE Player Development Exercises:

1. Before a game, a period, a quarter, an inning or a practice, just remind yourself of how much you enjoy playing the game.
2. It's important to appreciate the experience of the game as it's happening. Notice that you're doing one of the things you love best and give yourself the personal reminder, "Don't forget to have fun!"
3. Get into the habit of "checking in" during a practice or a game to make sure you are noticing that you are doing something you really enjoy.

PTQ Personal Training Questions:

1. Identify some games you've played in the past where, for whatever reason, you just forgot to have fun. List them.

_____
_____
_____

2. List some games during which you were really having fun.

_____
_____
_____

3. Consider whether there was any difference in your level of focus between the two lists. Note any differences below.

Strengthening Performance Focus – Questions #6-10

WHEN IN ERROR, DO DAMAGE CONTROL: Profile Question #10

The Barrier: Carrying Around A Mistake

It's hard not to focus on a mistake we've just made during a game and the more costly the mistake, the harder it is. The problem is, dwelling on a past mistake takes us out of the present. Part of our focus is somewhere else and we are more likely to make yet another mistake.

The Solution: Control the Damage

You don't want a mistake to cost more than it has already but dwelling on it can do exactly that. You may want to deal with the mistake, at some point, but while performing it's important to let it go.

PDE Player Development Exercises:
1. Use the "Stop It" command.
2. Remind yourself to, "Stay in the Now!" Use those words.

PTQ Personal Training Questions:

1. Identify the three most common mistakes that you tend to carry with you during a game. List them below.

a. _____
   b. _____
   c. _____

2. Rate the degree of difficulty you have in letting go of each of these three — with 1 being the least difficult and 10 being the most difficult.

Rating Date: ____ Rating Date: ____ Rating Date: ____
   a. ____            a. ____            a. ____
   b. ____            b. ____            b. ____
   c. ____            c. ____            c. ____

3. Check back with this list every week and re-rate the items to chart your progress regarding doing damage control.

Rating Date: ____ Rating Date: ____ Rating Date: ____
   a. ____            a. ____            a. ____
   b. ____            b. ____            b. ____
   c. ____            c. ____            c. ____

Figure 7s

BLOCK NEGATIVE MOTIVATION: Profile Question #11

The Barrier: Not Feeling Like It

In sports there are a lot of 'shoulds', things we know we should be doing to ensure that we develop our potential and then successfully put that potential to work. Those 'shoulds' relate to preparation, to practice, and to games. They are everywhere. It's true that we don't always feel like doing our 'shoulds.' But trouble comes, not when we don't feel like it. Trouble comes when we give into that feeling. It can happen in a flash. We hear an "I don't feel like it" and without even thinking, we walk away from what we know we should be doing, and are onto something else.

The Solution: Practice Success Motivation

Success motivation is the commitment to do what has to be done to be successful, whether we feel like it or not. Feeling like it is a bonus. It cannot be a requirement for doing what you know should be done. Don't interfere with your own success by giving in.

PDE Player Development Exercise:

When there is something you know you should be doing right now but you hear an "I don't feel like it," say to yourself, "Who asked you?", and order yourself back to work. Use this phrase as a reminder that for this activity, what you feel like doing is irrelevant.

PTQ Personal Training Questions:

1. List some activities you know you should be doing but don't always feel like it. (Examples might be: giving your all during practice, doing certain exercises, working on your mental game, weight training, only eating healthy foods, etc.)

a. _____
   b. _____
   c. _____
   d. _____
   e. _____

2. Place a check next to the items above that you almost always do whether you feel like it or not.

3. Of those items not checked off, consider whether or not you are paying a performance cost by not always following through.

SELF START: *Profile Question #12*

The Barrier: Needing External Pressure to Do Your Best

Pressure can be a really good thing. It can help us give our all. The problem comes when, in the absence of external pressure, we are unable to create, within ourselves, the pressure to do our best. We get into trouble when we become dependent on external motivation. Some examples: We don't commit as strongly to our exercise program in the off-season when no one is watching. We aren't great practice players because we don't feel there's that much at stake. We let up during a game because our team is really ahead or because we're losing big time.

The Solution: Self Start

It's great to be able to make good use of external pressure. But to make sure we reach the performance success we're capable of, it's important to be able to create pressure from within. This helps us be as productive and as dedicated as we can be when there is little or no external pressure.

PDE Player Development Exercises:

1. Make a list of those times when the motivation to give your all must come from within. Review the list monthly as a reminder that self starting is up to you.

2. When a coach or a teammate tells you that you need to put in more effort, see that as a warning that you may not be living up to your responsibility to self start.

3. Don't become dependent on your own weak performance to help pressure you to get back on track. Use a drop in your performance as a danger signal that you may not be pressuring yourself enough in the first place.

PTQ Personal Training Questions:

1. Look back at past seasons and ask yourself if there were any times when you needed external motivation because you weren't providing it for yourself. List them below:

_____
_____
_____

2. For each item listed, write down what could have happened if you had been a better self motivator.

Performance Barriers/Builders — Making Mental Discipline a Habit – Questions #11-15

FIGHT COMPLACENCY: Profile Question #13

The Barrier: Falling into Complacency

Personal or team success can sometimes breed complacency. We become satisfied and content with where we are, often without even realizing it's happening. We just stop or put less effort into doing the very things that brought about our success in the first place and our performance takes a dive.

The Solution: Run Interference

Even though complacency is often invisible we can still fight it. We can stop it from happening in the first place. A commitment to continuously strengthen performance can block complacency.

PDE Player Development Exercise:

1. Ask this question of yourself every day: "Today, did I perform at my personal best?"
   At times, the answer will likely be "No" because constantly performing at one's personal best is an unrealistic expectation. However, seriously considering the question and its answer, will guard against complacency.

2. Fighting complacency is an attitude more than anything else. To avoid the trap of complacency, remember to compete with yourself. Get into the habit of continuously reviewing your goals and performance, and make sure you continuously set the bar higher.

PTQ Personal Training Questions:

1. In the past have there been any major challenges you didn't meet to the best of your ability because, in retrospect, complacency crept into the picture. If there are any, list below.

_____
_____
_____

2. Looking at the present, might complacency be affecting any aspects of your performance without you having recognized it? If so, list below. For each item, how will you adjust your approach?

RUN GAME SCORE INTERFERENCE Profile Question #14

The Barrier: Focusing on Game Score
It is all too easy to unintentionally let down when your team is winning by a lot. Complacency can set in. It is also all too easy to unintentionally let down when your team is losing by a lot. You ask yourself, "What's the point?"

The Solution: Beware of Lopsided Scores
Become aware of the possible danger that a big score difference can have on your performance. Use being way ahead or way behind as a trigger to maintain your intensity.

PDE Player Development Exercises:
Make these commitments to yourself:
1. Remind yourself to watch out for lopsided scores.
2. When they happen, double down on your focus and intensity.

PTQ Personal Training Questions:
1. The last time you were in a game and the score became really lopsided, for or against your team, did you inadvertently let down? Please explain.
_____
_____
_____
_____

2. In that situation, did you remember to use the lopsided score as a trigger to double down on your focus and intensity? Describe what happened.
_____
_____
_____
_____

Figure 7w

Reinforcement Mentoring Exercises — Making Mental Discipline a Habit — Questions #11-15

GENERATE ENERGY: Profile Question #13

The Barrier: Giving In

It's good to feel energized. It supports performance. But there are times when we just don't have a lot of energy, and it's a lot harder to bring our 'A' game. We feel 'tired' and 'what's worse, we feel there's nothing we can do about it. We're trapped, or at least we believe we are. But are we really?

The Solution: Take Control and Energize:

There are some things that sap our energy over which we have little control, like illness or injury. Other times, there are things we can do to counter our low energy level and take control. We can intentionally raise our energy level.

PDX Player Development Exercises:

Here are three ways to energize. Experiment to find which method or methods are most useful to you.

1. The following breathing exercise can help create an immediate increase in energy. Take a few deep breaths and as you breathe in, give yourself the instruction: "I feel my energy level increasing." Though simple, this technique can be highly effective.

2. We all know what it feels like to be highly energized. For many athletes, the following exercise gets the job done. Close your eyes, picture that feeling, and simply tell yourself to energize.

3. Be your own cheerleader. Find a phrase that fires you up and use it when needed.

At first, practice your technique of choice for a few moments every hour so that you will have the technique readily available when needed.

PTQ Personal Training Questions:

1. Consider this: when your energy level is low for no apparent physical reason, do you let yourself become a victim or do you do something about it? Either way, what is the result?

_____
_____
_____

2. Can you think of any techniques, other than those presented in this program, that you have used successfully to instantly increase your energy level? If so, list below and consider making them a habit.

Personal Development Exercises — Building Self Awareness — Profile Questions #16–20

Build Self Awareness: Profile Question #16 & #17

The Barrier: The Practice of Superficiality

Developing self awareness and reflection are key components to a well-adjusted athlete. Knowing yourself really well is something to be pursued rather than a sign of weakness or softness. While athletes dwell on their statistics, playing time, or how they look to others, they often do not look deeply into themselves. It is hard to develop fully as a player without also developing deep knowledge of yourself as a person.

The Solution: Know Yourself

Athletes tend to spend a tremendous amount of time on their game and team relationships, but don't invest anywhere near the same amount of effort on their personal development. Reflecting on who you really are and investing in a relationship with yourself pays long term dividends.

Player Development Exercise:

Being self aware means knowing a lot about yourself. We don't usually take the time to self discover. As a starter, here are some of the questions that might give you a better sense of who you are:

1. What hobby would you pick up if you had the time?
2. What are three requirements you have for other people if they want to be your friend?
3. Who is your favorite amateur athlete?
4. What makes you angry?
5. What kinds of things make you laugh?
6. What kinds of people do you avoid?
7. What kinds of feelings do you have that you hide from others?
8. What kinds of feelings do you tend to share? Why?
9. Who in your family knows you best? Why?

This is just a starter list. You can add questions and engage teammates as part of your growth. Self aware athletes know the value of exercising and strengthening the body. You can also exercise and strengthen self awareness.

This is not a one-time assignment.

Figure 7y

Build Self Awareness: Profile Question #16 & #17 (continued)

PTQ Personal Training Questions:

1. Who are the people that you can be yourself around? Why is that? How does that help you?

2. Who are the people that you can't be yourself around? Why is that? How does that hurt you?

The answer to both of those questions should help you become even more self aware.

Figure 7z

Personal Development Exercise – Building Self Awareness – Profile Questions #16-20

Accurate Self-Evaluation: Profile Question #18 & #19

The Barriers: False Self-Evaluation

Athletes get into trouble when their evaluation of themselves as a player is not accurate. Some athletes believe they are better than they actually are. This can lead them to think that everyone else is wrong, out to get them, or has a personal grudge against them. This also makes it nearly impossible to accept feedback or corrective coaching. Another problem is when athletes land on the exact opposite end of the scale and constantly undervalue their abilities. This can be just as dangerous because it makes it almost impossible to reach their potential.

The Solution: Become More Open to Other Views of Your Talent and Performance

Players are surrounded with multiple opportunities to get feedback on their performance and behavior. As an athlete, it is important to seek out the evaluation of others that you trust and respect, and to be curious about how you might get better.

PDE Player Development Exercises:

1. Whose opinion of you as a teammate and player do you trust to be fair, informed, and accurate? Seek out that person and ask to meet away from the team. Make it a regular practice to go over how you are performing.

2. When someone is critical of you, you will have a tendency to get defensive. At that moment, remember to take a deep breath, shut up, and force yourself to listen.

PTQ Personal Training Questions:

1. Whether I like it or not, who seems to have the most accurate and honest take on my talent and performance? What are they telling me? Have I fought them or been open to them? Please elaborate.

_____

2. Describe a specific time when your view of your talent or performance was very different than what someone else thought. How did you handle it?

_____

3. Do I tend to overvalue or undervalue my contributions as a player and teammate? Give some examples.

Personal Development Exercise — Building Self Awareness – Profile Questions #16–20

You and Your Core Beliefs: *Profile Question #20*

The Barrier: Not Knowing Who You Want to Be

We often don't even ask the question of ourselves—who do I want to be? What are my core beliefs and values? What am I really all about? Even when we do come up with answers, we can often forget to match our actions and behaviors with those answers.

The Solution: Know Who You Want to Be and Take it Seriously

Knowing who you want to be and behaving that way can really help you be happier and more fulfilled as a team member, and more successful as a person. When players align their words and actions with what they say they stand for, they have taken a critical step toward personal integrity.

PDE Player Development Exercises:
1. Make a list of all the things you can think of that describe what it is you want to be.
2. While working on this skill, be sure to review this list each day.
3. At the end of the day, check to see how well you lived up to the items on the list.

PTQ Personal Training Questions:
1. If someone asked you to name the three most important things in your life, what would they be?
  _____
  _____
2. Who are some of the people in your life that clearly live by their core beliefs? Give a brief explanation about why you think so. What do you admire about them?
  _____
  _____
3. Think about a time when you did something related to athletics that did not reflect the values you want to live by. How did you feel after doing it? What harm did it do? Did you learn from it and grow or repeat the pattern? Please describe.
  _____
  _____

Figure 8b

Personal Development Review — Creating Strong Relationships – Profile Questions #21-23

Focus on Others: Profile Questions #21 & #22

The Barrier: Being Self Absorbed
Constant comparison with others (playing time, stats, praise, attention received) can cause athletes to see themselves as early in competition with others—fighting against them for everything. In this environment, a lack of concern for the feelings of others can thrive and often destroys the potential for relationships with other players.

The Solution: Take Time to Invest in Relationships with Others
Athletes who invest in relationships with others tend to be happier on teams and are more well-adjusted adults after their playing careers are over. Respecting the feelings of others creates a stronger connection to teammates, and lays the groundwork for athletic and personal success.

PDE Player Development Exercises:
1. Learn to be more open to the people around you. Schedule a time to meet with each player on your team—one on one.
2. When you think about the players on your team, do you know what really matters to them? Do you think you could name their goals as athletes? If not, start finding out.

PTQ Personal Training Questions:
1. If your teammates were asked if you cared about them or not, how would they answer?

_____
_____

2. List a time when someone on the team came to you and needed your help, and you came through for them. How did that impact the relationship?

_____
_____

3. Recall a time when someone on the team needed your help and you did not help. Did that impact the relationship?

Personal Development Series — Creating Strong Relationships – Profile Questions #21-25

Take Care of Your Relationships: Profile Question #23

The Barrier: Thoughtlessness in Relationships

Even when we have the best of intentions we make mistakes by hurting others, betraying a loyalty, or saying things we regret. This can have a negative effect on building and maintaining healthy relationships. It can destroy the confidence and trust others have in us, and can result in feelings of isolation and frustration.

The Solution: Be More Thoughtful

Recognize that relationships on a team take a long time to build but can be greatly damaged in an instant. When facing a decision that will impact others, take the time to think through how your choices can hurt them. In addition, good decision making also requires being clear about what you want, gathering the right information, careful assessment of your options, perhaps seeking feedback, and checking in with your core beliefs.

Player Development Exercises:

You can increase your chances of making better decisions in relationships if you use a process rather than shoot from the hip. Think of a decision coming up soon and practice this decision-making process:

1. What do you want to have happen?
2. What information should you take the time to gather?
3. What are your options and the pros and cons of each choice?
4. Should you run this by someone else?
5. Make your decision.

Each time you face choices in your relationships, especially the big ones, practice the process. You will soon find yourself beginning to do this automatically.

Personal Training Questions:

1. Think of a time when you made a bad decision that hurt a teammate. Had you used the process laid out above, would that have changed your decision in that situation?

2. Think of a time when you did the right thing in a relationship. How did it make the other person feel? How did it improve the relationship?

Figure 8d

Let Go of Grudges: Profile Question #23

The Barrier: Not Letting Go of Grudges

It's easy to get angry and hold a grudge when others treat us poorly. However, staying angry can hurt us more than it hurts them.

The Solution: Letting Go

Letting go of the grudge can free us up to focus our efforts on other things. It also leaves the door open to repairing the relationship. Forgiveness is a practice and skill that can be very powerful on a team.

PDE  Player Development Exercises:

When you are really angry with someone, ask yourself the following questions:
1. Do I really have to hold on to this grudge?
2. How is this grudge hurting me?
3. Did I contribute to the fight?
4. Have I done anything like it before to this person or someone else?
5. Do I have the energy to stay mad and if so, for how long?
6. What would it feel like to just let it go?

This process can be practiced each time you find yourself distracted by anger, hurt, or resentment.

PTQ  Personal Training Questions:

1. Think about a specific time in athletics when someone wronged you in a significant way? How did you handle that? Were you able to forgive the person or are you still holding onto a grudge? Did they forgive you? If not, how did that make you feel? If they have forgiven you, how did that change the relationship? Elaborate.
_____
_____
_____
_____

2. Think about a time when you have wronged someone else. Did they forgive you? How did that make you feel? Elaborate.
_____
_____
_____

Figure 8e

Personal Development Exercise | Effective Communication Skills – Profile Questions #26–30

Communicate Openly: Profile Question #26

The Barrier: The Art of Pretending

We live in a culture where people are discouraged from sharing their deeper thoughts and feelings. This creates a stage play where we all wear masks and agree to a level of phoniness. Sometimes we don't share our feelings because doing so can be used against us in the competitive realities of sports. However, the reality is that can prevent deep connections to each other—connections that enhance relationships, athletic performance, and team cohesiveness.

The Solution: Be More Open with Others

Take the risk of being a person who refuses to be phony with others. That's not to say we go around like an open book, but great things can happen when we communicate more openly. It is a sign of great courage to communicate how we feel and it can pay major dividends on a team, and in a life.

Player Development Exercises:

As with any other skill, practice helps us get better at expressing our opinions and talking about how we feel about things. The following exercise with another team member will help both of you get practice.

1. Practice this with a team member. Each person should answer the following:
   a. What is your favorite team memory so far? Talk about it. How did it make you feel at that moment?
   b. Who are some of the people you admire most on our team? Why?
   c. Do you feel like your talents and contributions are appreciated by the rest of the team? Give some examples of how you felt when you were recognized and when you were not.
   d. How good is our team at communicating with each other? Why do you think that?
   e. What kinds of things seem to cause us to shut down and not talk to each other? How does it feel to be on this team when we shut down?
   f. How do you feel when you make a big mistake in a game that hurts the team? Can you think of a specific incident?
   g. How do you feel about the way others treat you after a mistake? When did that last happen?
   h. What are some problems we are having on the team that are hard to talk about?
   i. Are there cliques or divisions that are dividing the team? How does that hurt us?
   j. What could we do to improve our team chemistry?

2. Think about someone on the team who you really appreciate or someone who you seem to be struggling with. Rehearse what you would say to them. Think through the most helpful way to have that conversation. Now, go schedule a time to have that conversation and do it.

Figure 8g

Personal Development Exercise — Effective Communication Skills – Profile Questions #26–30

Communicate Openly: Profile Question #26 (continued)

Personal Training Questions:

1. Sometimes it is helpful to look at the reasons we don't share our feelings. It can be past negative experiences, the fear of looking stupid, a lack of trust in others, not having any role models, or no one else on the team is doing it. What are your reasons? List them.

2. Who do you know who is really good at being open with others? How does it seem to work for them?

Figure 8h

Personal Development Avenue — Effective Communication Skills — Profile Questions #26–30

Be There for Others: *Profile Question #27*

The Barrier: Not Making Yourself Available

People know by reading us, and by their past experience with us, whether or not we are interested in supporting them, listening to them, investing in them. Sometimes our past behavior has taught them not to waste their time looking to us for help.

The Solution: Decide to Be There for Others

Being there for others is a critical life skill and fosters team chemistry and solidarity. Sometimes athletes, especially talented athletes, get a lot of attention, and become selfish. Look out for opportunities to be there for your teammates. Consciously decide to never be just a taker. Be a giver, too.

Player Development Exercises:

1. Looking back on the last week, were there any opportunities to support a teammate that you may have missed, or saw and didn't follow through on? Is there anything you can do about that now? If so, do it.

2. One of the simple things you can do is just let it be known that you are willing to support someone else, give to them, help them out. It might just be assumed in some team relationships, but is there someone on your team that you feel would benefit from hearing this from you? Decide to reach out and make it happen in the next 24 hours.

Personal Training Questions:

1. How many people would say that they come to you when they need advice or support? Give a number. _____

2. Is there someone in your life that many people seem to come to for help? What is it about them that makes others feel so comfortable? List those things. Now, how many of those do you demonstrate?

3. Who do you tend to go to when you need help as an athlete? Why?

4. Who comes to you for help? What kind of help are you good at giving?

Figure 8i

Personal Development Exercise: Effective Communication Skills - Profile Questions #26-30

Have the Tough Conversation: Profile Question #29

The Barrier: Avoiding Tough Conversations

Having tough conversations can bring out a defensive or angry reaction from other people. We also know that it can make other people feel badly, something we don't like doing. If we are raising an issue about the behavior of someone else, it also calls into question our own behavior, which isn't always perfect. We'd rather avoid the drama.

The Solution: Have the Courage to Have the Difficult Conversation

Being able to engage in tough conversations is important to personal development, player performance, and team chemistry. Facing these head on is a critical team and life skill that will significantly enhance your ability to communicate effectively with others, and will improve your value and contribution to the team.

PDE Player Development Exercises:

1. Identify any tough conversations that you need to have with somebody right now that you have avoided having. Sometimes, being clear about why you are avoiding them can help.

2. Rehearse the conversations in your head a number of times until you feel more comfortable and confident.

3. Commit to having one of those conversations in the next week.

PTQ Personal Training Questions:

1. It is important to look at your pattern of handling tough conversations. What do you need to do in situations like this? Please explain.
_____
_____
_____
_____

2. The inability to engage in tough conversations on teams is a sure way to limit your performance as a player and as a team. Please give an example in your athletic career where this might have happened.
_____
_____
_____

Figure 8j

Personal Development Exercise     Effective Communication Skills – Profile Questions #26-30

Listen Well: Profile Question #29

The Barrier: Bad Listening Habits

Whether it is from lack of interest or practice, most people do not fully listen to others. Sometimes we just get caught up in our own issues. Other times we think we are listening but it is only half-hearted, or we really are just waiting for our turn to talk.

The Solution: Be Fully Present

Being a great listener is a matter of choice and practice. One of the greatest ways to build relationships is to let people know that they matter to you and people can tell this by how well you listen to them.

PDE Player Development Exercises:
1. When working on this exercise, start the day with a reminder to really LISTEN.
2. When talking to people, focus on their words, make good eye contact, repeat what you think you heard to make sure you understand, and, if appropriate, ask follow-up questions.
3. Make sure you use every conversation as an opportunity to practice your listening skills.

PTQ Personal Training Questions:
1. Are there people in your life who really listen to you? Who are they? How do they make you feel in that moment?
   _____
   _____

2. On your team, who would say that YOU are a great listener? How does that impact those relationships?
   _____
   _____

3. Thinking about your important conversations today, were there any when you forgot to listen well?
   _____
   _____

Develop a Leadership Identity: Profile Questions #31 & #32

The Barrier: Lacking Leadership Knowledge

Early in athletic careers, becoming a "leader" or "captain" on a team is often just a function of the player's talent level, size, or general personality. Leadership positions can be based on pretty superficial things, with some players thinking they've got it and others thinking they don't. This can get in the way of everyone seeing themselves as leaders and making important contributions to the team.

The Solution: Regularly Engage in Leadership Training

Leadership is a skill that can be understood, learned, practiced, and demonstrated by every player. In fact, it is everyone's responsibility. Athletes who work on their leadership abilities with the same commitment as any other skill related to their sport often find themselves growing in confidence and effectiveness as a leader.

Player Development Exercises:

1. Our ideas about leadership begins to form before we ever enter school or play organized sports. When you look at your role models growing up, think about what you learned from them about being a leader. What are some of the traits or qualities that went into them being a good or bad leader?

2. The world of athletics has many examples of great leaders. Lucky for us, many of them have written books and articles to help us along the way. Who are some of your favorite leaders in athletics? Have any of them written books? If so — time to buy a book and read it.

Personal Training Questions:

1. What do you think your strengths are as a leader? How have you used them on past teams? Give specific examples.

_____
_____
_____
_____

2. What do you think your weaknesses are as a leader? How have those weaknesses hurt you from being effective in the past? Does a specific situation or incident come to mind? Please explain.

Total Leadership Courses  Leadership Awareness and Skills - Profile Questions #41-45

Step Up: Profile Question #33

The Barrier: Lack of Courage and Experience

These are powerful peer influences that contribute to a lack of confidence in leading others. Sometimes we hesitate because we don't want to be ripped on or look stupid. Other times we just aren't sure of what to say. This can cause us to sit back and let others take the lead.

The Solution: Practice Courage

It is often said that athletics is a great preparation for life. Learning to lead on a team is a critical skill that can be rehearsed and practiced from the start of amateur play. Many athletes begin to become leaders by taking on smaller tasks as a way of gaining confidence. The more you put yourself out there, the easier it is to step up and lead when the situation calls for it.

PDE Player Development Exercise:

1. When thinking about an upcoming practice, weight training session, or competition in the next week, be on the lookout for a situation where you could demonstrate leadership—either by word or action. This week, pick one situation and give it a try. You can repeat this every week and gradually increase the difficulty of the situation as you gain confidence.

PTQ Personal Training Questions:

1. A great way to gain confidence is to pay attention to other leaders. We are surrounded by leaders who demonstrate the very skills we are trying to learn. If one would just pay attention to what we see every day as athletes and students, we would learn a great deal! Pick one leader that you respect and see on a regular basis and just pay close attention to them this week. Notice how they handle situations, people, conflict, and communication with others. As you do this, come back here and write your observations below.

_____
_____
_____

2. In general, would you say you are eager to lead or more timid? Why do you think that is?

_____
_____

3. Can you think of a specific situation in the last year when you did not step up and lead, and it hurt your team? Describe what happened.

_____
_____

4. Can you think of a situation outside of athletics where you demonstrated leadership and it made a real difference? What was the situation? How did you feel about it afterwards?

Motivate and Inspire Others: Profile Question #34

The Barrier: Lack of Clarity About What Drives Me

We often find ourselves in situations that require someone to lead the way—to say or do the right thing at the right time that makes the big difference. This can be in the locker room, the weight room, or during a game. The problem is that we just haven't asked the question, "What really motivates and inspires me?" Without having asked and answered that question, we are not as prepared to lead others as we could be.

The Solution: Understanding What Motivates Me

Once we are clear about what drives us, we are better able to influence others on the team. Our motivations will be read and we will become leadership role models for our teammates.

Player Development Exercises:

1. Athletes, more than almost anyone else, tend to know what kinds of things push them to greater performance. So, what pushes you? Write these things down.

2. If you understand what really gets you going, chances are these same things get others on your team fired-up as well. Review this list before a practice or game so that you can have them ready to go if and when the opportunity to motivate others arises.

3. Review this list once a month to see if you want to make any adjustments.

Personal Training Questions:

1. Can you think of a player or coach who is great at inspiring or motivating others? What is it and why do you think they are effective? What specific talents or skills do they demonstrate?

2. Inspirational leaders usually have an answer to the question, "Why would anyone follow me?" Do you have an answer to that question for yourself? Either way, please explain your answer.

Figure 80

Team Leadership Lessons — Leadership Awareness and Skills — Profile Questions #31-35

Seek Feedback: Profile Question #35

The Barrier: Not Asking for Help

Once we have decided to engage in leadership activities, we usually don't ask for feedback to improve our leadership skills. It's easier not to ask how we did. It sure saves time and, sometimes, our feelings. The problem is that others may have valuable input that could be a gold mine in helping us become great leaders.

The Solution: Reach Out

Leaders who seek out support and feedback from coaches, teammates, and others, continuously grow in their leadership skills.

Player Development Exercises:

1. At the end of a day, think back to see if there was a time when you decided to lead. Afterwards, did you check in with others to see how effective you were? If not, make a point to do it as soon as possible.
2. Make it a habit to look for times when people on your team demonstrate effective leadership. When you see it, give them the positive feedback they deserve.
3. Sometimes, we are lucky enough to have role models who are really open to the feedback of others, such as teachers, coaches, parents, or relatives. Not only do they listen, but they take the feedback to heart and get better as leaders. Go find one of these people and ask them to talk about this approach to leadership.

Personal Training Questions:

1. In the world of sports, asking for help is often seen as a sign of weakness rather than strength. On teams on which you have played, have the coaches, captains, or teammates sought feedback about their leadership style and effectiveness? If yes, give examples. If not, how would it have helped?

2. Leading athletic teams, as a coach or player, is a very difficult task. How would it impact teams if captains, coaches, and players had the kind of relationship where they really relied on each other's honesty and feedback to become better leaders? Elaborate.

Figure 8p

Hold Yourself and Others Accountable: Profile Question #36, #37, #38

Team Leadership Indicator: Accountability to Self and Others – Profile Questions #36-40

The Barrier: Taking the Easy Way Out

Perhaps the most difficult aspect of athletic teams is personal and team accountability. If players cannot hold themselves and each other accountable to live up to their commitments, individual and team performance will suffer. However, standing up and holding ourselves and others accountable can be a very tough thing to do and an easy thing to avoid.

The Solution: Pay the Price of Leadership

Strong leaders must be willing to pay the price of leadership and live up to their responsibilities while expecting teammates to do the same. In fact, there is no more important leadership skill. When players learn to take responsibility for their own behaviors and hold others responsible for theirs, they are preserving their integrity and that of the team.

PDE Player Development Exercises:

1. At the end of every week, ask yourself the question: "How accountable have I been as a member of my team? Is there anything I could or should have done to be more accountable?" Commit to fix these things in the next week.

2. As a leader, you are probably aware of teammates who aren't living up to their responsibilities or are breaking team rules. Determine how you might effectively hold them accountable, and follow through on it this week. Are there others on the team you might recruit to help you with this?

PTQ Personal Training Questions:

1. Almost everyone has been on a team where there was a lack of accountability. How did that impact your performance and the performance of the team? Describe.

2. When there is no accountability—trust disappears. Have you ever seen that happen? Please elaborate.

Figure 8q

Hold Yourself and Others Accountable: Profile Questions #36, #37, #38 (continued)

Accountability to Self and Others – Profile Questions #36-#40

Personal Training Questions Continued:

3. How do you react when others try to hold you accountable? Do you become defensive? Do you go on the attack? Do you stay open, listen, and think about what they've said? Give examples.

_____

4. When was the last time you called someone out on their behavior that was hurting the team? What was the reason you did that? How did it work out?

_____

5. Can you think of a player who is good at holding themselves and others accountable on any team you've been a part of? Who was that? Why were they good at it?

_____

6. Can you think of a time when you knew team rules were being broken, and you didn't step up and stop it? Why didn't you speak up? Should you have?

Team Leadership Success — Accountability to Self and Others — Profile Questions #36-40

Be a Role Model: Profile Question #39

The Barrier: Forgetting the Importance of Our Actions

One way that we lead is by example. If you are a poor role model you not only hurt yourself but can also drag down the entire team.

The Solution: Remembering You're Always a Role Model

Leading by example is huge. Others see our behavior, and it influences how they behave. Strong leaders remember that they are always a role model and take this responsibility to heart. When we consistently do things the right way in practice, in games, by how we treat others, it strengthens our ability to lead by example and has a positive impact on overall team chemistry and performance.

PDE Player Development Exercises:

1. Whether it is taped to your locker, placed in your wallet, written on a post-it note, or embedded on your home screen, find a way to physically remind yourself that you are a role model. Do this today.
2. Check in with yourself at the end of every week as to how you are doing as a role model. Think back and look at your behavior for the week. Give yourself a grade of A through F.

PTQ Personal Training Questions:

1. What reputation do I currently have on my team? Is it positive or negative or both? Have I earned that? Is it fair? Please address these questions below.
   _____
   _____
   _____
   _____

2. If there was a team meeting and you weren't there:
   a. What three positive things would you want them to say about you as a person or teammate?
      i. _____
      ii. _____
      iii. _____
   b. For each of those three things, write down three behaviors you would need to consistently model to earn that.
      i. _____
      ii. _____
      iii. _____

Figure 8s

Team Leadership Journey — Accountability to Self and Others — Profile Questions #36–40

Admit When Wrong: Profile Question #40

The Barrier: Hiding Our Mistakes

In highly competitive situations and team settings, it can be especially hard to admit our mistakes. Athletes often fear it will impact their status on the team, effect playing time, or how other people view them.

The Solution: Admit Our Mistakes

The first step in accountability is being honest about your past mistakes and admitting you were wrong. Role models aren't necessarily people who have always done the right thing—they can also be people who have made mistakes and owned up to them.

PDE Player Development Exercises:

1. Make the commitment to "open up" when your behavior, whether related to practice, games, or team relationships, has not lived up to the standards that should be reflected by a player on your team.

2. When focusing on this exercise, spend time at the end of the day and look to see if there were any opportunities to apologize that were missed—opportunities, that if taken advantage of, would have made you a better leader. Fix this as soon as possible.

PTQ Personal Training Questions:

1. We've all done things we aren't proud of on teams. Think of a time that stands out in the past year. Have you really come clean, owned up to it, and made honest apologies? Describe the situation.

2. It's one thing to make a mistake and apologize. It's another thing to have actually stopped the behavior that hurts yourself or others on the team. Looking at the example you just talked about in question #1, have you stopped the behavior? Elaborate.

3. When we admit we are wrong and apologize to others, it can have a powerful positive impact on the relationship. It opens the door for others to come clean also, and can pave the way to an even stronger connection. Can you think of any situation where you've seen this happen on a team? Explain.

Figure 8t

Team Leadership Exercise — Enhancing Role as a Team Player – Profile Questions #41-45

Relate to Everyone: Profile Question #42

The Barrier: Taking the Easy Way Out

It's a lot easier to relate to a small group of players, especially ones that you have a lot in common with, than it is to relate to the entire team. Sticking with that small group is taking the easy way out and hurts overall team cohesion.

The Solution: Be a Bridge Builder

Successful teams benefit when all of its players make the effort to build relationships with each other. Not everyone will be best friends, but having a level of comfort with everyone on the team is critical. As a member of the team, build relationships with everyone.

PDE Player Development Exercises:

1. There are probably a number of players on your team with whom you don't spend much time—teammates you don't know very well. Identify who those players are by making a list.
2. Make it a goal to spend more time with at least two players on that list every week.
3. Keep track of your progress going through that list.

PTQ Personal Training Questions:

1. Are you someone that makes the effort to build unity and friendships on the team, or do you tend to keep to yourself? Elaborate.

2. On your current team, can anyone hang out with anyone or are there cliques or small groups that tend to always be together? What impact does this have on team chemistry?

3. Team members share a common bond in their sport, but can often be very different from each other in terms of family background, race, socioeconomic status, religious beliefs, political affiliation, sexual orientation. How do you make sure that you don't allow these differences to get in the way of your building relationships?

4. When was the last time you went out of your way to really get to know someone else on the team that you don't know very well? How did that work out? What did you discover? If you haven't done it yet, who would be the person you'd like to approach first?

Figure 8v

Player Leadership Program — Enhancing Role as a Team Player – Profile Questions #41-45

The Unselfish Leader: Profile Questions #43 & #44

The Barrier: "But What's In It for Me?"

You can't talk about leading people if you don't care about people. Even though no one likes to be known as a selfish player, it's pretty common. This can be especially true because players are not only competing with players from other teams but are often going head to head with their own teammates for who gets the most playing time or the most recognition. Sometimes a player's family, friends, or future goals can add to the problem. This culture of selfishness can keep us from supporting our teammates both as players and as people. This hurts team performance, team chemistry, and cripples our ability to lead.

The Solution: Invest in Others

Of course you have to be concerned about your own needs and development. However, the moment a player decides to also really focus on the needs of teammates, during play and outside of play, their value to the team increases dramatically, as does their reputation. This unselfish leader not only makes the play of their teammates better, they make their teammates better as people. On this kind of team, players take great pride in the success and achievements of others, knowing they have been a part of it.

PDE Player Development Exercises:

1. This first exercise is about you as a player. Honestly look at your overall performance and style of play in games. Ask yourself this question, "Do I do things that may make me look good but may, in fact, hurt team performance?" If you're not sure, ask a coach or teammate to help you figure it out. If so, determine how you can change that behavior. Commit to doing so. Evaluate your progress at least once a week.

2. This second exercise is about you as a team member. If we pay attention and we care about teammates, we will be blocked with tons of opportunities to support them in small and big ways. Whether someone is struggling with an injury, a family problem, school issues, dating troubles, or countless other potential difficulties, we can make a difference. As a team leader, it's our responsibility to do so. Think about someone on your team who may benefit from you reaching out to them and offering your support. In the next week, find the right time and place to reach out privately and do it.

When to Follow: Profile Questions #45

Enhancing Role as a Team Player – Profile Questions #41-45

The Barrier: Great Ideas Aren't Always Yours

In sports, there is a time to lead and a time to follow. Just as some people have difficulty leading, there are others who have difficulty following. Both are important. To not be open to the positive leadership, ideas, and direction of others, is to rob the team of the valuable influence on their leadership. Walking away from a good idea simply because it wasn't yours is foolish, and can hurt both your development and the team's.

The Solution: Follow the Leader

Be open to the ideas and influence of your teammates. That does not mean to follow them no matter what. It does mean to give other peoples' suggestions a really fair hearing. When you see value in what they are saying, it is critical to energetically follow their lead.

Player Development Exercises:

1. It's pretty easy to look for the flaws rather than the value in other peoples' ideas. When working on this skill, develop the habit of effective followership by:
    a. At the start of the day, give yourself this simple instruction: "Look for the value in the suggestions and ideas of others." Take this instruction seriously.
    b. When you see value in these suggestions and ideas, consider whether the suggestion is worth following. If you decide it is, then commit to supporting that idea.
    c. At the end of the day, look back to see if you remembered to look for value in other peoples' ideas.

Personal Training Questions:

1. Much is written about leadership but little is said about followership. What do you think makes a player a great follower? Why is it important to have great followership on teams?

2. It is really important to know when it's time to lead and when it's time to follow. How will you know when it is time for you to follow?

3. Do you know of anyone that seems just as comfortable leading as following? Who is it? Why do you think they are able to pull this off? How does it help our team?

4. Can you think of a situation where you normally would have led but you held back and accepted the idea or suggestion of someone else? How did that work out?

Figure 8y

SYSTEM AND METHOD FOR DEVELOPING ATHLETES

BACKGROUND OF THE INVENTION

The invention relates generally to the systems and methods for processing data. More specifically, the invention is a system and method (collectively, the "system") for processing data to facilitate the development of athletes.

While there is a growing awareness that athletes and particularly young athletes can greatly benefit from a systematic process for developing their abilities, there are a significant lack of options for doing so. No athlete development program currently exists that brings together performance psychology, personal development, and team leadership. The prior art does not offer an approach that integrates these elements in providing an interactive tool that can be used in conjunction with a highly prescriptive skills development process. It would be desirable for athletes to systematically at strengthening key performance areas using such a system.

The system is described in greater detail below in the Summary of the Invention section.

SUMMARY OF THE INVENTION

The invention relates generally to the systems and methods for processing data. More specifically, the invention is a system and method (collectively, the "system") for processing data for developing athletes.

The system allows athletes to benefit from a systematic application of athlete development through the use of information technology. The system can integrate data relating to performance psychology, personal development, and team leadership in a comprehensive, integrative, and iterative manner. The system can be embodied as iterative assessment tool that is used in conjunction with a highly prescriptive skills development process. The system can be used by individual athletes, or as part of developing an entire team of athletes, with different individual athletes focusing on their respective weaknesses.

Some embodiments of the system can be implemented in a largely stand-alone manner with no aggregation and data sharing beyond a particular athlete. Other embodiments may facilitate the transmission of aggregated data sharing with the coach, but the omission of personally identifiable information to the coach. Still other embodiments of the can be implemented to "factor in" insights and inputs from parents, coaches, trainers, health care providers, and fellow teammates as well as from the particular developing athlete. Such embodiments can facilitate the automated exchange of communications and interactions between relevant users in a manner that is consistent with the rules and settings of the system.

The system can be implemented in a highly prescriptive and comprehensive manner, directing athletes to work on areas that are critical to their athletic performance that have previously been ignored or not dealt with in a systematic, measured, or concrete way. The system can be implemented in a manner that integrates with the scientific and/or objective measurement of various skills, specific sports statistics, and athletic attributes.

The system can be implemented to build internal and behavioral habits in performance psychology, personal development, and team leadership. These three areas, and the sub-areas included, building upon each other to enhance player performance. The face and content validity of the product suggest a unique approach that has great value for participating athletes. Certain embodiments of the system have undergone psychometric analysis and has been found to have high degree of reliability and validity.

The system can be better understood by referencing the drawings discussed below.

BRIEF DESCRIPTION OF THE DRAWINGS

Different examples of various attributes, components, and configurations that can be incorporated into the system are illustrated in the drawings described briefly below. No patent application can expressly disclose in words or in drawings, all of the potential embodiments of an invention. In accordance with the provisions of the patent statutes, the principles, functions, and modes of operation of the system are illustrated in certain preferred embodiments. However, it must be understood that the system may be practiced otherwise than is specifically illustrated without departing from its spirit or scope.

FIG. 1a is a block diagram illustrating an example of an athlete interacting with the IT infrastructure of the system. The interactions occur through the exchange of data back and forth between the athlete and the IT infrastructure.

FIG. 1b is a block diagram similar to the illustration in FIG. 1a. In the example illustrated in FIG. 1a, multiple athletes of different ages and skill-levels are interacting with the same IT infrastructure.

FIG. 3b illustrates an example of athletes, parents, coaches, trainers, and health providers interacting with each other subject to the contours of relationships defined by the system.

FIG. 6a is a flow chart diagram illustrating an example of an iterative process of assessment and improvement in the development of an athlete utilizing the system.

FIG. 6b is a flow chart diagram illustrating an example of an iterative process of assessment and improvement in the development of an athlete utilizing the system.

Figure 8X:
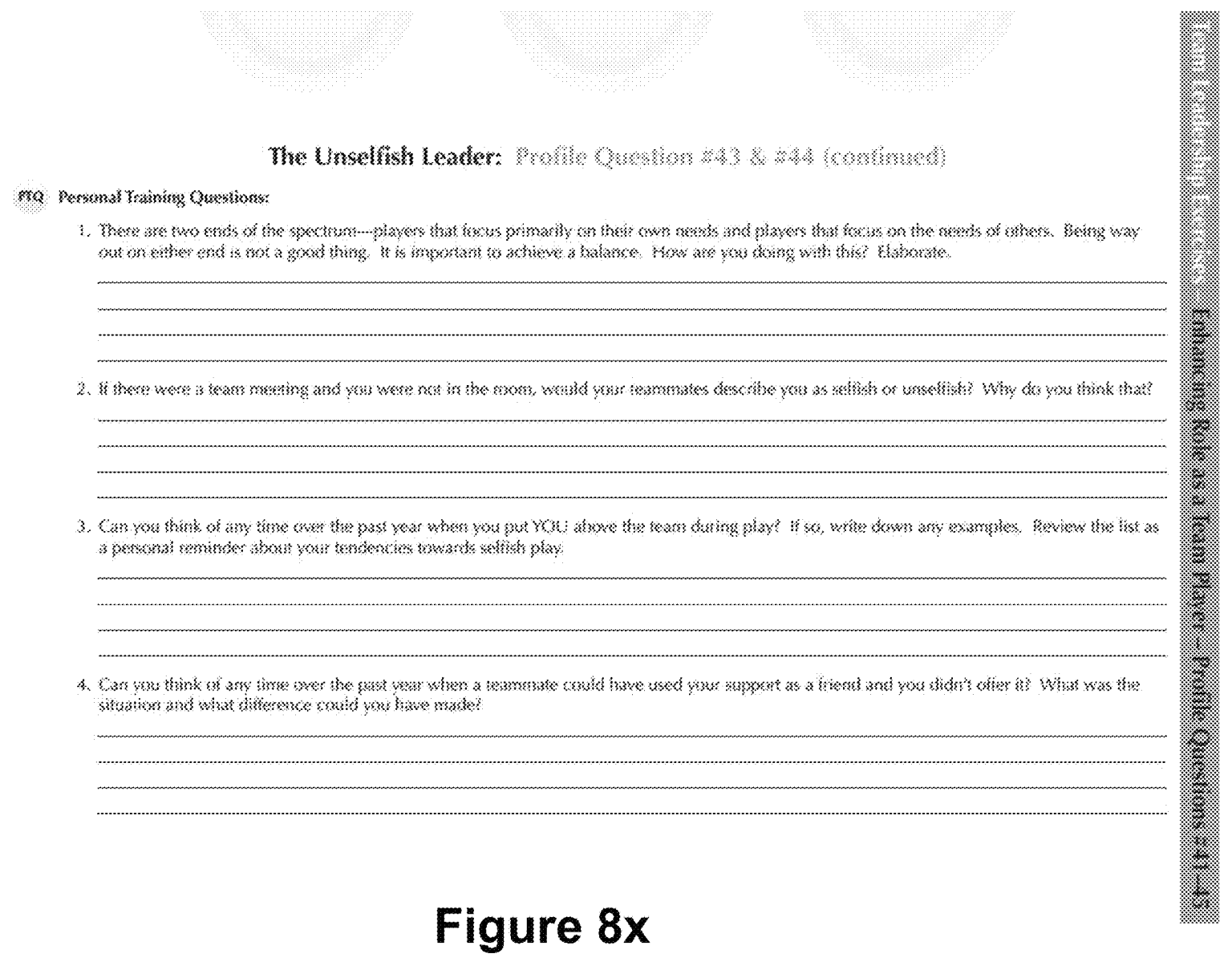

FIGS. 7a-8y represent examples of screens that can be included into an interface through which a user interacts with the system.

FIG. 7*a* is an example of a notification and information screen for coaches.

FIG. 7*b* is an example of a notification and information screen for athletes.

FIG. 7*c* is an example of a screen for athletes that presents athletes with a questionnaire comprised of multiple-choice questions.

FIG. 7*d* is an example of a screen for athletes that is similar to the screen illustrated in FIG. 7*c*.

FIG. 7*e* is an example of a screen that displays the scoring methodology for generating scores to the answers provided in FIGS. 7*c* and 7*d*.

FIG. 7*i* is an example of a screen that can summarize various scores and identify the relative strengths and weaknesses of the athlete.

FIGS. 7*k*-7*o* are examples of screens that explain certain objectives, communicate certain exercises to the user, and submits certain questions to the user for which the user can provide answers. FIGS. 7*k*-7*o* relate to the skill area of BSC and the development category of performance psychology.

FIGS. 7*p*-7*s* are examples of screens that explain certain objectives, communicate certain exercises to the user, and submits certain questions to the user for which the user can provide answers. FIGS. 7*p*-7*s* relate to the skill area of SPF and the development category of performance psychology.

FIGS. 7*t*-7*x* are examples of screens that explain certain objectives, communicate certain exercises to the user, and submits certain questions to the user for which the user can provide answers. FIGS. 7*t*-7*x* relate to the skill area of MDH and the development category of performance psychology.

FIGS. 7*y*-8*b* are examples of screens that explain certain objectives, communicate certain exercises to the user, and submits certain questions to the user for which the user can provide answers. FIGS. 7*y*-8*b* relate to the skill area of BSA and the development category of personal development.

FIGS. 8*c*-8*f* are examples of screens that explain certain objectives, communicate certain exercises to the user, and submits certain questions to the user for which the user can provide answers. FIGS. 8*c*-8*f* relate to the skill area of CSR and the development category of personal development.

FIGS. 8*g*-8*l* are examples of screens that explain certain objectives, communicate certain exercises to the user, and submits certain questions to the user for which the user can provide answers. FIGS. 8*g*-8*l* relate to the skill area of ECS and the development category of personal development.

FIGS. 8*m*-8*p* are examples of screens that explain certain objectives, communicate certain exercises to the user, and submits certain questions to the user for which the user can provide answers. FIGS. 8*m*-8*p* relate to the skill area of LAS and the development category of team leadership.

FIGS. 8*q*-8*t* are examples of screens that explain certain objectives, communicate certain exercises to the user, and submits certain questions to the user for which the user can provide answers. FIGS. 8*q*-8*t* relate to the skill area of ASO and the development category of team leadership.

FIGS. 8*r*-8*t* are examples of screens that explain certain objectives, communicate certain exercises to the user, and submits certain questions to the user for which the user can provide answers. FIGS. 8*q*-8*t* relate to the skill area of ASO and the development category of team leadership.

FIGS. 8*u*-8*y* are examples of screens that explain certain objectives, communicate certain exercises to the user, and submits certain questions to the user for which the user can provide answers. FIGS. 8*u*-8*y* relate to the skill area of RTP and the development category of team leadership.

Figure 2A:
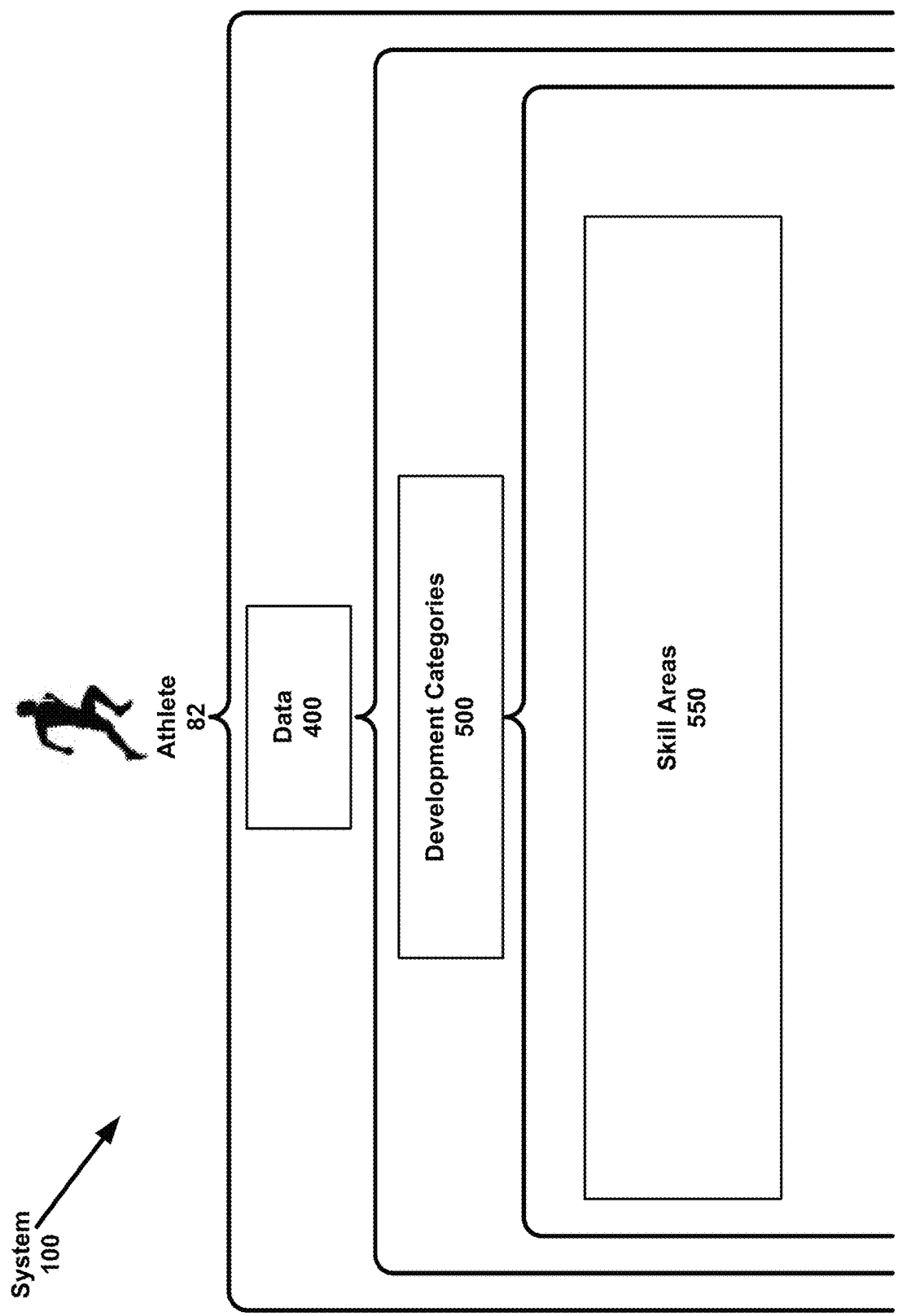
FIG. 2a is a data hierarchy diagram illustrating an example of how at athlete can be represented in the system as a collection of data, that the collection of data can be organized into particular data categories, and that data categories can be organized into certain skill areas.

The system can be further understood by the text description provided below in the Detailed Description section.

DETAILED DESCRIPTION

The invention relates generally to the systems and methods for processing data. More specifically, the invention is a system and method (collectively, the "system") for processing data for developing athletes.

The system transforms a general purpose computer that users would already have and utilize in their everyday lives into a machine that can provide professional quality expertise in the development of athletes. This can enable even relatively young athletes to engage in development services that would otherwise be unavailable to them.

Different embodiments of such a system can provide coaches, parents, trainers, medical professionals, and other teammates a role in the process of helping individuals develop as athletes. Different embodiments of the system can also integrate with other sources of data and communication to better monitor results, identify causalities, identify correlations, etc. that are relevant to the development of athletes.

I. Glossary of Terms

All terminology associated with an element number is defined in Table 1 below Table 1.

| Number | Name | Definition/Description |
| --- | --- | --- |
| 80 | User | A human being interacting with the system 100. Example of users 80 can include but are not limited to athletes 82, parents 84, coaches 86, trainers 88, and providers 89. A user 80 of the system 100 can be differentiated on the basis of their role 81 in interacting with the system 100. |
| 81 | Role | A relationship, function, or point of view of a user 80. A particular user 80 of the system 100 can possess one or more different roles 81 in different contexts. For example, an athlete 82 of one team, could be a parent 84 of child who is an athlete 82 in a different league, while acting as a coach 86, trainer 88, or provider 89 for still other athletes 82 in other leagues. |
| 82 | Athlete | A user 80 who is engaged in athletic competition. The purpose of the system 100 is to develop athletes 82. The system 100 is intended to benefit the development of athletes 82 with respect to one or more sports 90. |

-continued

| Number | Name | Definition/Description |
|---|---|---|
| 84 | Parent | A user 80 who interacts with the system 100 on the basis of a familiar relationship with an athlete 82. |
| 86 | Coach | A user 80 who interacts with the system 100 in their role as a developer of an athlete 82. In many embodiments of the system 100, the coach 86 will be responsible for a team of athletes 82 utilizing the system 100. |
| 88 | Trainer | A user 80 who interacts with the system 100 in their role as someone responsible for the physical fitness of an athlete 82. |
| 89 | Provider | A user 80 who interacts with the system 100 in their role as a healthcare provider, such as doctor, nurse, physician assistant, or pharmacist. |
| 90 | Sport | An athletic activity involving one or more athletes 82. Some sports 90 are team sports 92 while other sports 90 are individual sports 96 |
| 92 | Team Sport | A sport 90 in which two or more athletes 82 participate collectively in an athletic competition. Examples of team sports 92 include but are not limited to baseball, football, lacrosse, soccer, tennis, track, hockey, swimming, and volleyball. |
| 96 | Individual Sport | A sport 90 which the individual athlete 82 competes solely on behalf of himself or herself. Examples of individual sports 96 include but are not limited to tennis, golf, skiing, swimming, and wresting. |
| 100 | System | A collective combination of an IT infrastructure 200 and data 400 that is used to enhance the development of one or more athletes 82. |
| 200 | IT Infrastructure | A configuration of components that is used to process and communicate data 400. The IT Infrastructure 200 is used by the system 100 to create, update, and communicate data 400 that enables and enhances the development of an athlete 82. |
| 210 | Computer | An electronic device for storing and processing data 400. Computers 210 typically include one or more processors 220, one or more interfaces 230 through which a user 80 can interact, one or more applications 240 that can be run on the computer 210, one or more storage components 250 such as a hard drive for storing data 400, and one or more network adapters 280 for connecting to one or more networks 290. |
| 212 | Client Device | A computer 210 used by a user 80 to interact with the system 100. |
| 214 | Mobile Device | A client device 212 that is mobile, such as a smart phone or tablet computer. |
| 216 | Server | A computer 210 used to house the applications 240 that are accessed by users 80. A server 216 is not controlled or operated by an individual user 80, as the server 216 is maintained by the organization responsible for making the system 100 available to users 80. |
| 220 | Processor | Often referred to as a CPU or central processing unit, a small chip or similar device that is capable of running a software application 240. |
| 230 | Interface | The collective means by which a user 80 can interact with a computer 210. Common examples of interfaces include graphical user interfaces, such as web pages. |
| 240 | Application | A computer program that consists of instructions performed by the processor 220. |
| 250 | Storage Component | A component used by the computer 210 to store data 400. Examples of storage components 250 include hard drives, CD-ROM, flash drives, and other technologies and services known in the prior art and subsequently developed in the evolving information technology infrastructure. |
| 260 | Database | An application 240 that facilitates the orderly and efficient storage, retrieval, updating, and deleting of data 400. Many, but not all databases 260, are relational databases 260 utilizing SQL. |
| 280 | Network Adapter | A component used by a computer 210 to access a network 290, allowing the computer 210 to send and receive data 400 across the network 290. |
| 290 | Network | An aggregate configuration of information technology components that enable the transmission and receipt of data 400 from one computer 210 to another computer 210. |
| 292 | Wireless Network | A network 290 that does not utilize wired connections to connect multiple nodes. |
| 294 | Wired Network | A network 290 that utilizes wired connections to connect multiple nodes. |
| 296 | Internet | A global network 290 with both public and private access. |
| 300 | Sensor | A device that enables the capturing of data 400 relating to one or more athletes 82. |
| 310 | Person-Based Sensor | A sensor 300 that captures data 400 from one athlete 82 at a time. Many person-based sensors 310 can be worn by a particular athlete 82. |
| 312 | Location-Based Sensor | A sensor 300 that captures data 400 relating to a particular location in an athletic competition. Many cameras 322 are location-based sensors 312. |
| 320 | Microphone | A sensor 300 that provides for the capture of data 400 in the form of sound. |
| 322 | Camera | A sensor 300 that provides for the capture of data 400 in the form of a visual image. |
| 324 | Video Camera | A camera 322 that provides for rapidly and repeatedly capturing data 400 in the form of visual |

-continued

| Number | Name | Definition/Description |
|---|---|---|
| | | images such that the attributes of movement over time are conveyed in a realistic manner. |
| 330 | Metric Sensor | A sensor 300 that captures data 400 in the form of a measurement, such as a mass, weight, velocity, acceleration, temperature, etc. |
| 400 | Data | Information that is captured, created, updated, or deleted by the system 100. Data 400 can include any information that is cognizable to the system 100. |
| 410 | Input | Data 400 that received by the system 100 from a user 80, sensor 300, or computer 210 that exists outside the system 100. |
| 420 | Sensor Data | Data 400 captured by a sensor 300. |
| 430 | Answer | Data 400 provided by a user 80 in response to a question 479. |
| 432 | Self-Assessment | An answer 430 in which the user 80 is providing information about himself or herself. |
| 434 | Accomplishments/ Strengths | A response to question 479 where the accomplishments/strengths of the athlete 82 are identified. |
| 436 | Weaknesses/Ways to Improve | A response to a question 479 where the weaknesses of the athlete 82 are identified. |
| 440 | Sports Statistics | Objective data 400 relating to an athletic competition that relates to one or more athletes 80. |
| 450 | Profile | An ongoing collection of data that relates to an athlete 82. Different embodiments of the system 100 can maintain different profiles 450 of the athletes 82. Profiles 450 often embody a more persistent model of the athlete 82 beyond a particular event or day while in contrast, a questionnaire 430 can represent more of a snapshot it time. |
| 452 | History | In some embodiments of the system 100, every past input 410 and output 460 of the system 100 can be stored for future reference as history 452. History 452 can potentially serve as a input 410 for future outputs 460. |
| 460 | Output | Data 400 generated by the system 100, typically from one or more inputs 410. |
| 462 | Status | A state or condition relating to an athlete 82. Different embodiments of the system 462 can assign different statuses 462 to athletes 82 and even other users 80 of the system 100. |
| 464 | Assessment | An evaluation or estimation relating to an athlete 82. |
| 466 | Certification | An official attestation of award of a particular achievement or accomplishment relating to an athlete 82. |
| 468 | Objective | A goal associated with an athlete 82. |
| 470 | Exercise | An activity cognizable to the system 100 that relates to development of an athlete 82. |
| 472 | Action Plan | A set of activities and objectives 468 over a particular period of time that pertain to an athlete 82. |
| 474 | Score | A numerical metric or rating that is selectively created from the applicable inputs 410 of the system 100. |

-continued

| Number | Name | Definition/Description |
|---|---|---|
| 476 | Graph | A visual representation of outputs 460. Scores 474 can be particularly conducive to being illustrated in the form of a graph 476. |
| 478 | Questionnaire | A collection of questions 479. |
| 479 | Question | A query asked of a user 80 soliciting an answer. |
| 480 | Communication | A type of output 460 that involves the transmission of information to one or more users 80 that relate to an athlete 82. Some embodiments of the system 100 can be configured to automatically generate communications 480 to athletes 82 and other users 80 of the system 100. |
| 482 | E-Mail | A communication 480 that consists of an electronic message conveyed between two or more electronic mail addresses. |
| 484 | Text Message | A communication 480 that consists of an SMS (short messaging service) message or similar messaging technology. |
| 486 | Social Media Posting | A publication on a social media platform such as Facebook, Instagram, Twitter, etc. |
| 500 | Player Development Categories or Categories | A category of data 400 that relates to the development of an athlete 82. A typical embodiment of the system 100 will categorize data 400 in terms of performance psychology 510, personal development 520, and team leadership 530. |
| 510 | Performance Psychology or Performance | Data 400 relating to the performance psychology of the athlete 82. |
| 520 | Personal Development or Personal | Data 400 relating to the personal development of the athlete 82. |
| 530 | Team Leadership or Leadership | Data 400 relating to the leadership of the athlete 82. |
| 550 | Skill area | An expertise or ability on the part of an athlete 82. The system 100 can be used to process data 400 that associated with various different skill areas 550. In some embodiments of the system 100, skill areas 550 are associated with specific categories 500. |
| 562 | BSC | Building self confidence |
| 564 | SPF | Strengthening Performance Focus |
| 566 | MDH | Making Mental Discipline a Habit |
| 572 | BSA | Building Self Awareness |
| 574 | CSR | Creating Strong Relationships |
| 576 | ECS | Practice Effective Communication Skills |
| 582 | LAS | Expanding Leadership Awareness and Skills |
| 584 | ASO | Strengthening Accountability to Self and Others |
| 586 | RTP | Enhancing My Role as a Team Player |
| 900 | Method | A process for utilizing data 400 to develop one or more athletes 82. |

II. Overview

The system 100 is a potentially useful tool to develop athletes 82. As illustrated in FIG. 1*a*, the system 100 can be implemented as an athlete 82 interacting with an IT infrastructure 200 through the exchange of data 400 back and forth. This can be done is a highly stand-alone manner, and even through the use of physical paper and manual computations in lieu of the IT infrastructure 200. The athlete 82 is prompted to provide answers 430 to questions 479. Those answers 430 can then be used to calculate various scores 474 that relate to specific skill areas 550 which fall into specific development categories 500. This enables to system 100 to help identify the relative strengths and weaknesses of the athlete 82 so that the athlete 82 can address their weaknesses over time. Interactions between the athlete 82 and the system 100 can occur over time so that the progress or regression of the athlete 82 can be monitored, both in the aggregate, as well as with respect to the particular skill areas 550 and development categories 500.

In some embodiments of the system 100, questions 479 are dynamically selected by the system 100 based on the history 452 of the athlete 452, the profile 450 associated with the athlete 82, the configuration of processing rules enabled by the athlete 82 and the underlying software applications 240, or other data-based distinctions by the system 100. The selective identification of questions 479 to be asked can be differentiated on the basis of age, the type of sport, the level of competition, feedback received from other users 80, the history 452 of the athlete 82, sports statistics 440, sensor data 420, previous action plans 472, past communications 480, and other factors.

When the system 100 is implemented in a significantly stand-alone manner, all data 400 and the application(s) 240 enabling the system 100 can be stored on a single mobile device 214. Such a system 100 can be implemented and configured so that only the athlete 80 has access to the data 400 created, updated, and accessed by the system 100. In other embodiments, data 400 can be shared or selectively shared with parents 84, coaches 86, trainers 88, health care providers 89, and other athletes 82. Such data sharing can be done in an anonymous fashion so that while a coach receives aggregated data 400 for his team, the coach 86 cannot receive personally identifiable data 400 attributed to a specifically identifiable athlete 82. can be implemented to assist an athlete 82 without the involvement of anyone else. The system 100 can be implemented with customizable data sharing rules in which users 80 define the manner and magnitude of data 400 access by other users 80. Such rules will often differentiate other users 80 on the basis of their role 81 with respect to the particular athlete 82.

A potentially wide variety of data 400 can be utilized by the system 100 to help the athlete 82 to address their weaknesses and improve upon their strengths. This can be done in an ongoing iterative process of assessment and improvement using a universal or substantially universal tool that is customized in its application to the particular athlete 82 because the input-output feedback loop impacts the data 400 sought by the system 100 and how that data 400 is used. As illustrated in FIG. 1b, different athletes 82 of different ages, skill levels, goals, etc. can interact with the same system 100 on an individualized basis. An all-American star athlete in college and a pre-teen playing sports at the recreational level can both use the system 100 to improve as athletes because the system 100 can be used to identify strengths and weaknesses so that the system 100 can then help athletes address their weaknesses. The more than an athlete 82 uses the system 100, they more than can improve and the greater self-awareness they can develop in the growth process. The system 100 can also be used to capture insights regarding various data causations and correlations that become easier to identify when large volumes of data 400 can be mined to make such assessments. The more history 452 that is captured by the system 100, the greater the benefit of machine learning and data mining can uncover insights that can be used to help athletes 82 on a going forward basis.

Figure 2B:
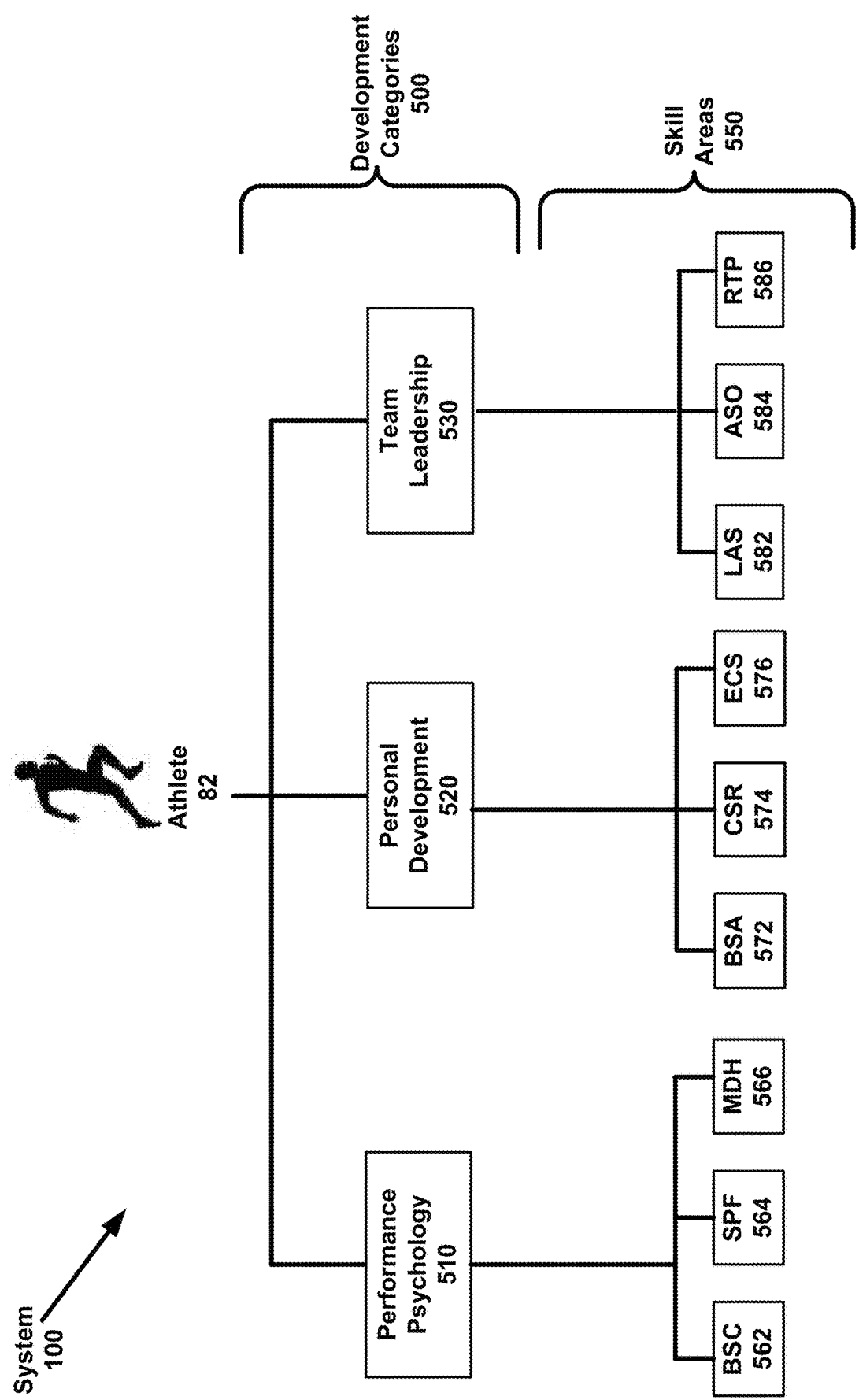
FIG. 2b is a data hierarchy diagram similar to the illustration in FIG. 2a, with specific examples of data categories and skill areas that can be incorporated in to the processing performed by the system.

The system 100 can be implemented using a wide variety of different types of data 400. The process of developing the athlete 82 using the system 100 is a data-driven process. As illustrated in FIG. 2a. data 400 can be comprised of a wide variety of development categories 500 which in turn can be comprised by a wide variety of sub-categories or skill areas 550. As illustrated in FIG. 2b, the system 100 be implemented with the categories 500 that include performance psychology 510, personal development 520, and team leadership 530. Skill areas 550 can include but are not limited to BSC 562, SPF 564, MDH 566, BSA 572, CSR 574, ECS 576, LAS 582, ASP 584, and RTP 586.

Figure 3A:
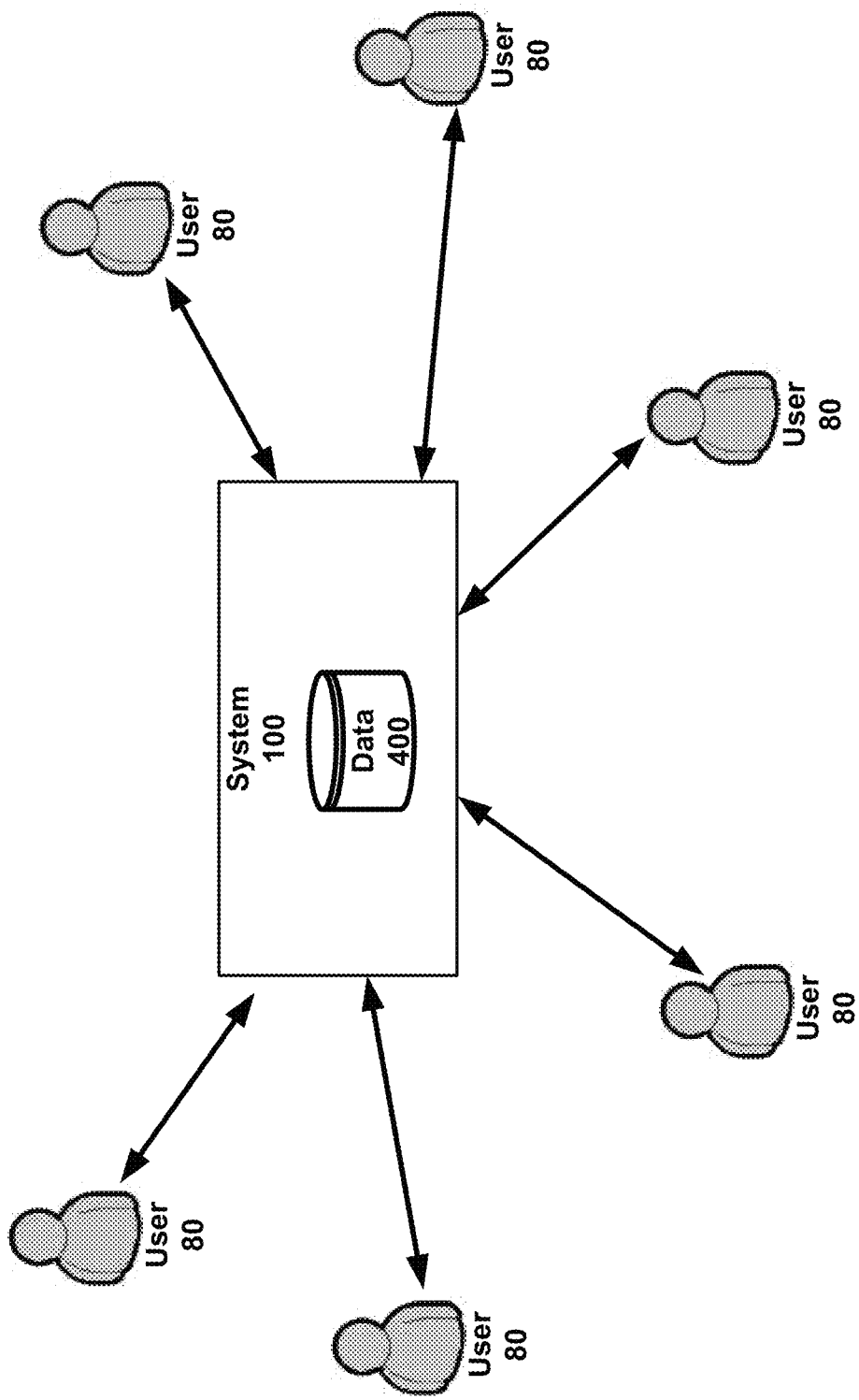
FIG. 3a is a block diagram illustrating an example of how users can interact with the system and through the system, each other.
Figure 3B:
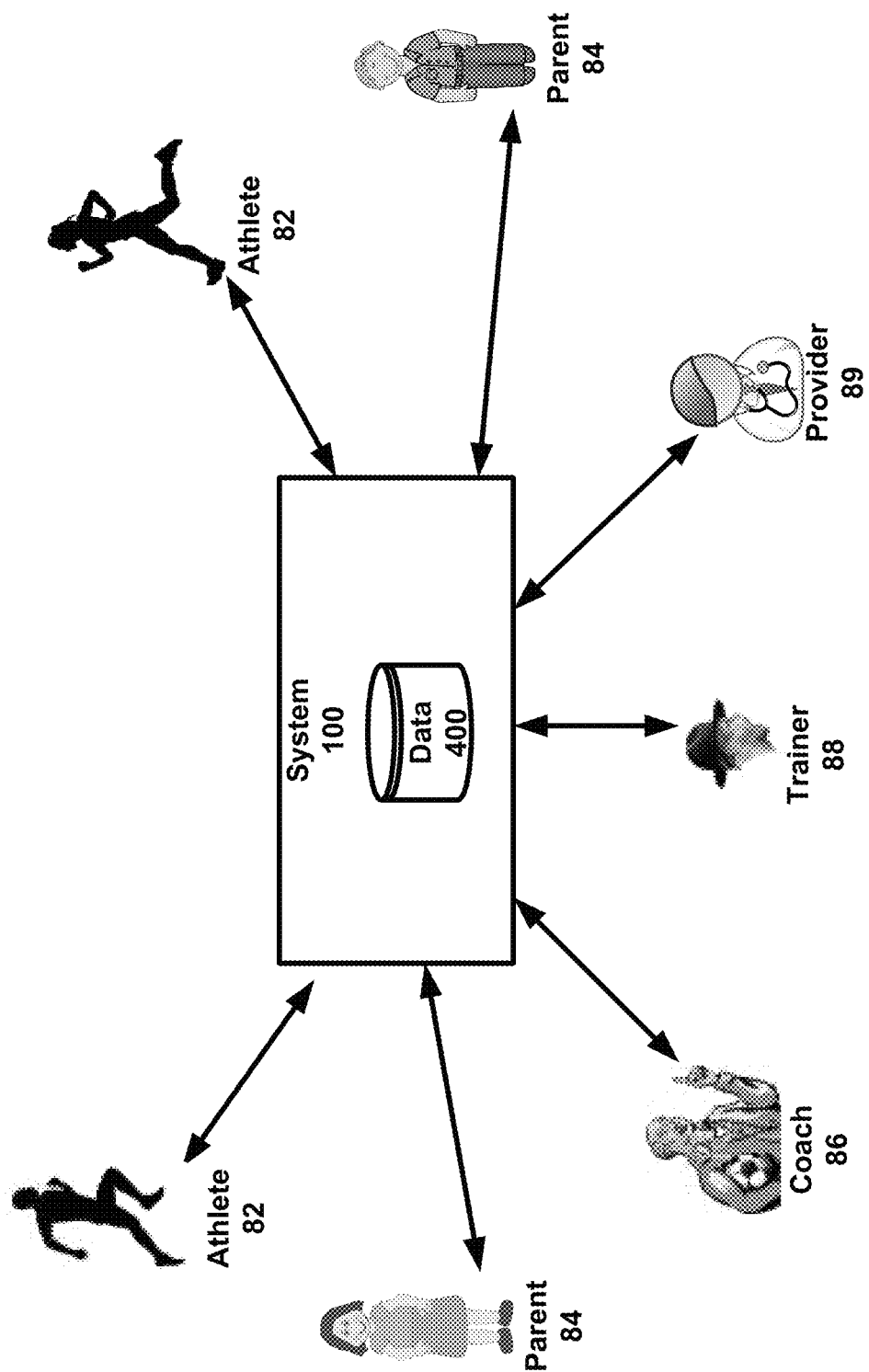
FIG. 3b is a block diagram similar to the illustration in FIG. 3a. In the example illustrated in FIG. 3b, the various users have different roles with respect to the system.

As illustrated in FIG. 3a, the system 100 can provide a way for users 80 to interact with each other through the processing of the system 100. The system 100 can also be implemented to incorporate feedback, insights, and other types of input from parents 84, coaches 86, physical trainers 88, physicians and other health care providers 89, and teammates of the athlete 82. Increasing the number of ways that users 80 interact with each other can create more data 400 and more opportunities to gather insights from the machine learning and data mining of that data 400 by the system 100. The system 100 can also be used to facilitate communications 480 between users 80 in potentially helpful ways. Such communications 480 can be automated using the processing rules of the system 100 (for example, a coach 86 can be automatically sent an e-mail notifying the coach 86 that a particular athlete 82 has achieved an important benchmark, or status 462 or score 474) or fully manual (for example, a parent 84 could use the system 100 to send an encouraging social media post 486 that makes use of data 400 accessible on the system 100). As illustrated in FIG. 3b, the processing of the system 100 with respect to a particular athlete 82 can be selectively influenced by data 400 relating to other athletes 82 on the team, the coach 86, parents 84, a trainer 88, and a health care provider 89 such as a physician. The core of the system 100 is typically the feedback provided by the athlete 82 to the system 100 in the form of answers 430 to questions 479, but that core can be selectively augmented with data 400 from other users 80 and sources.

Figure 4:
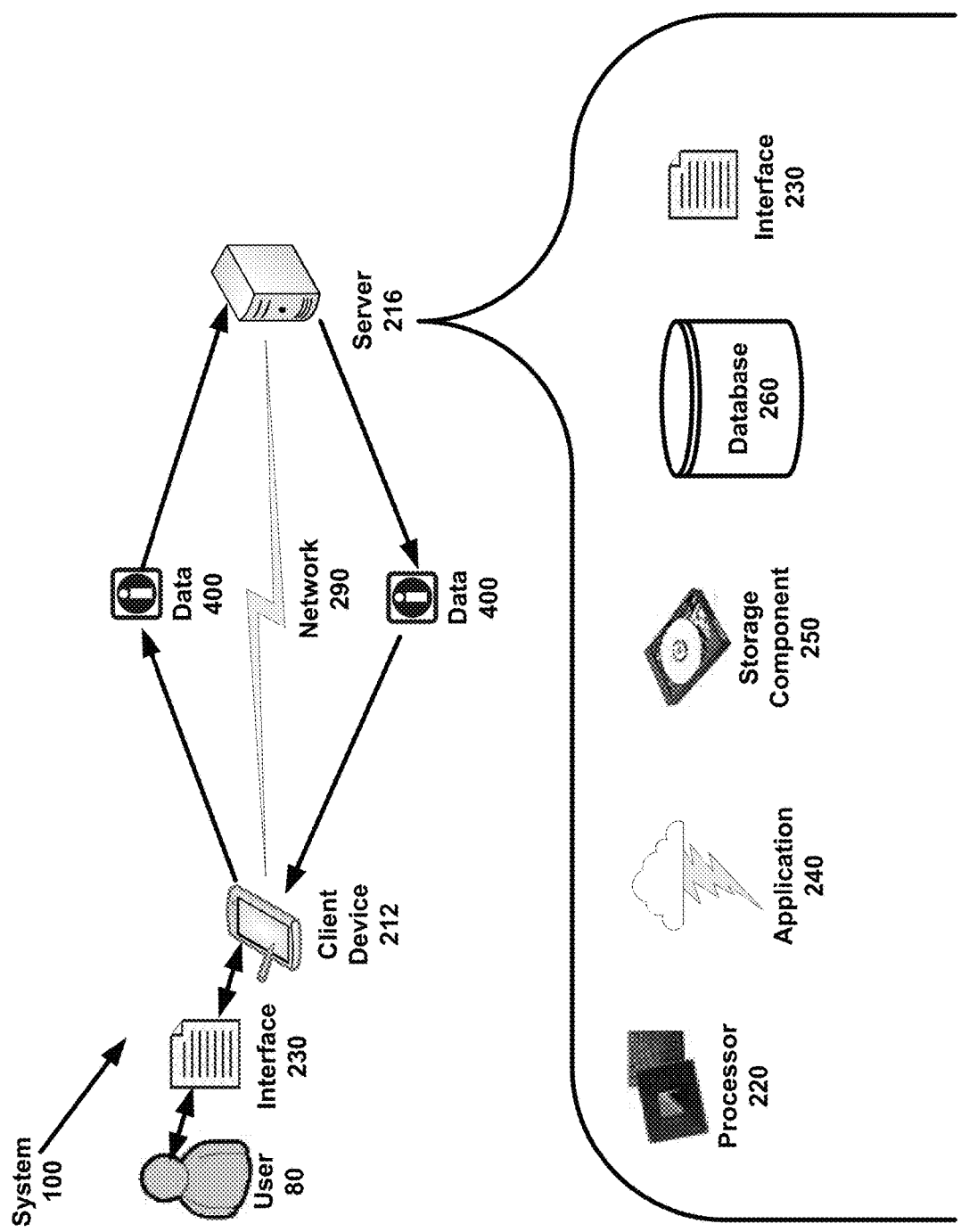
FIG. 4 is an environmental diagram illustrating an example of various IT infrastructure components that can be incorporated into the functionality of the system.

The system 100 can be implemented in a wide variety of different IT infrastructures 200. FIG. 4 is an example of such an infrastructure. Ordinary consumer devices such as a smart phone, tablet computer, laptop computer, desktop computer, or other form of readily available general purpose computer 210 can be transformed into a machine for helping an athlete 82 develop as an athlete. Users 80 interact with the system through an interface 230 such as a web page, graphical user interface, or similar mechanism on the computer 210 which has a processor 220 to run one or more applications 240, and a storage component 250 that includes a database 260 for storing data 400. Many embodiments of the system 100 will use a client/server architecture, using a remote server 216 to support the processing needs of many users 80. Other embodiments of the system 100 can utilize a substantially stand-alone architecture, with a single computer 210 possessing the entire IT infrastructure 200 used to support the functionality of the system 100 with respect to that user 80.

Figure 5A:
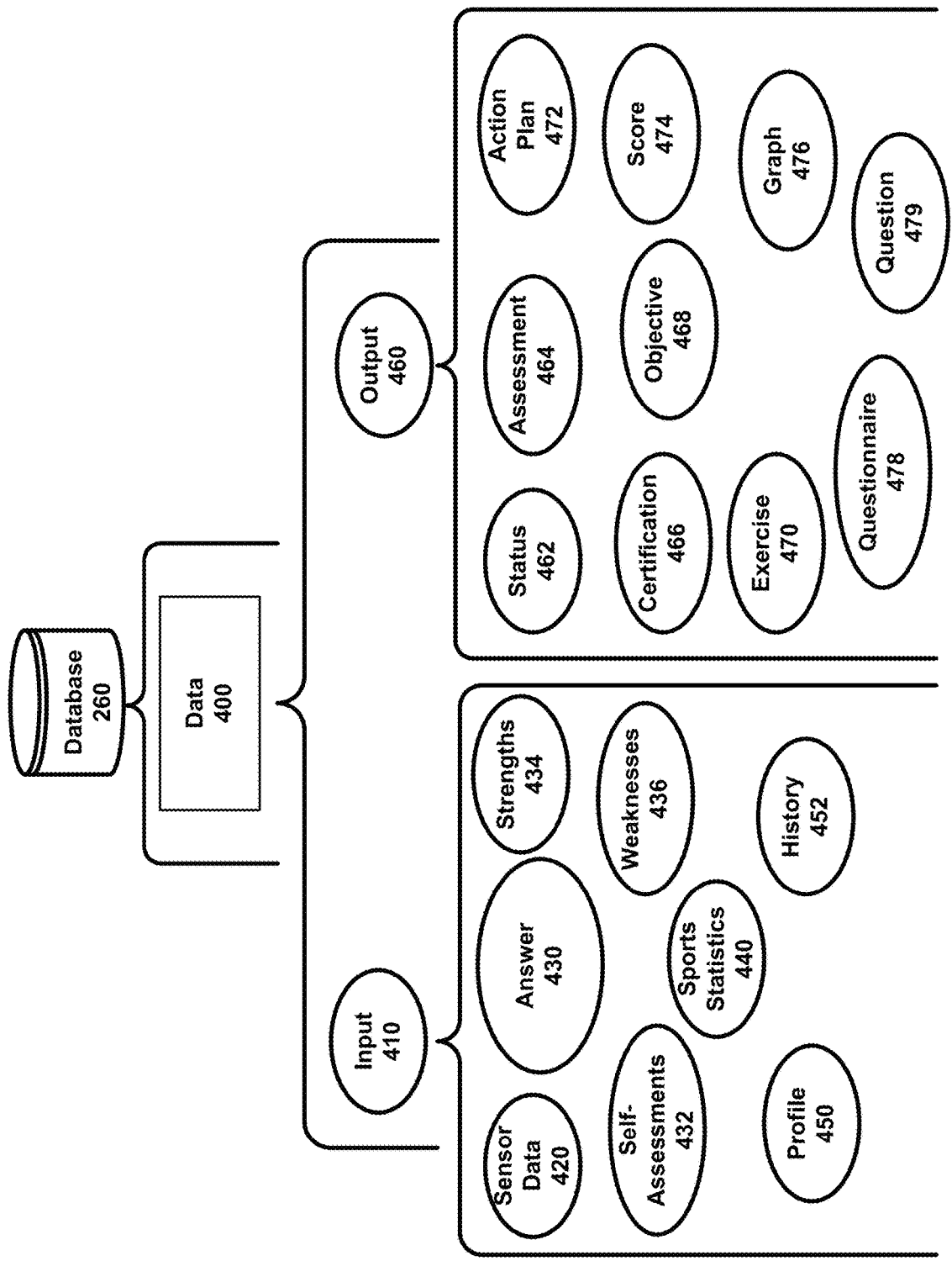
FIG. 5a is a data hierarchy diagram illustrating an example of the different inputs that can be used individually or collectively in accordance with the particular program to create one or more outputs.

As illustrated in FIG. 5a, there are a wide variety of inputs and combination of inputs can be used by the applications 240 of the system 100 to create one or more outputs 460. Those outputs 460 help the athlete 82 improve, and such outputs 460 can constitute future inputs 410 as the athlete 82 goes through an ongoing process of improvement.

Figure 5B:
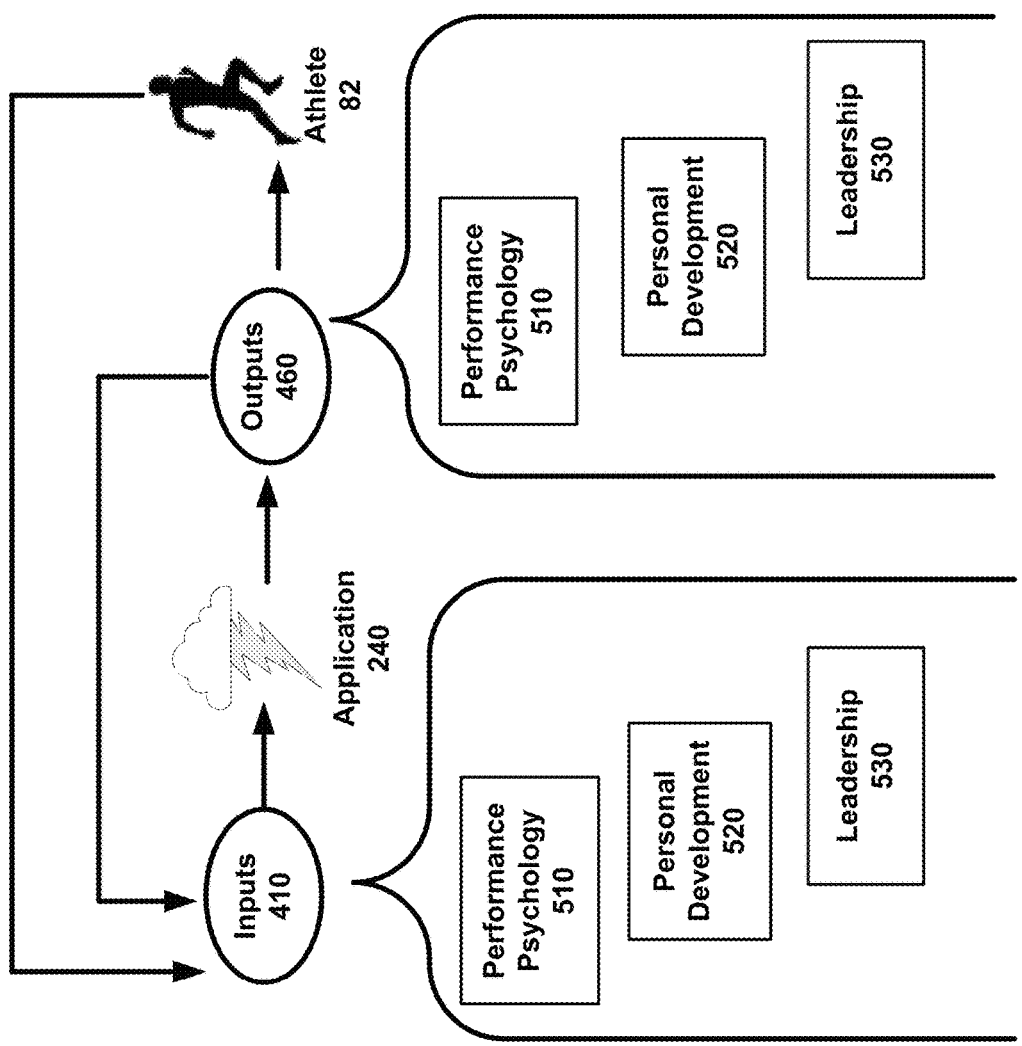
FIG. 5b is an input-output diagram illustrating an example of a system where inputs and outputs include the categories of performance psychology, personal development, and leadership.

FIG. 5*b* illustrates an example of a potentially continuous loop between inputs and outputs. As illustrated in the figure, data 400 in terms of both inputs 410 and outputs 460 can be organized into development categories 500 such as performance psychology 510, personal development 520, and leadership 530. As illustrated in FIG. 2*b*, each of these categories 500 can include specified skill areas 550.

FIGS. 6*a* and 6*b* are flow chart diagram illustrating an example of a potentially continuous loop of assessment, feedback, and improvement. The system 100 can be implemented to perform iterative loops of questions and answers over time in a never ending manner. This allows the system 100 to continuously monitor the development of athletes. In some embodiments of the system 100, the questions 479, exercises 470, and objectives 468 used solicit feedback from the athletes 82 are selectively identified by the application(s) 240 of the system 100, differentiating outcomes based on virtually any combination of data 400 that is cognizable to the system 100.

III. Introduction of Elements

The system 100 can be understood as one or more users 80 interacting with an IT infrastructure 200 in the creation, updating, and exchange of data 400. It is through that processing of data 400 that athlete 82 can improve and develop.

A. Users

FIG. 1*a* is a block diagram illustrating an example of an athlete 82 interacting with the IT infrastructure 200 of the system 100. The interactions occur through the exchange of data 400 back and forth between the athlete 82 and the IT infrastructure 200. The data 400 going back and forth between the user 80 and the system 100 is in the form of a potentially wide variety of inputs 410 and outputs 460. The outputs 460 of the system 100 prompt the user 80 to provide new inputs 410 to the system 100, and those new inputs 410 prompt the system 100 to create new outputs 460. That feedback loop can provide a valuable tool for the development of athletes 82 when the data 400 is properly organized into a set of development categories 500 which are in turn organized into operational skill areas 550. By breaking down the data 400 in this manner, the system 100 can help athletes 82 assess areas of strength and areas of weakness in specific and cognizable ways.

FIG. 1*b* is a block diagram similar to the illustration in FIG. 1*a*. In the example illustrated in FIG. 1*a*, multiple athletes 82 of different ages and skill-levels are interacting with the same IT infrastructure 200. Each athlete 82 can use the same system 100 and the same IT infrastructure 200 to engage in a development process that is customized to that particular athlete 82 because the interactions are comprised of data 400 while also being selectively influenced by data 400. The different athletes 82 are distinguished by the different data 400 associated with the athletes 82. However, the system 100 can better benefit all of the athletes 82 by providing a valuable opportunity to pool large quantities of data 400 together. Such data 400 can be subjected to machine learning and data mining techniques that can uncover insights usable across the system 100 by future athletes 82.

FIG. 3*a* is a block diagram illustrating an example of how users 80 can interact with the system 100 and through the system 100, with each other. The system 100 can be used to create, send, and receive communications 480. Those communications 480 can be manual or automated. For example, athletes 82 successful in reaching some goal that the system 100 can cognizant of could receive an automated communication 480 expressing congratulations. The performance metrics of the system 100 can be communicated in an automated matter to parents 84, coaches, and other users 80 in accordance with the processing rules of the system 100, which will often depend on the particular preferences of the relevant athlete 82.

FIG. 3*b* is a block diagram similar to the illustration in FIG. 3*a*. In the example illustrated in FIG. 3*b*, the various users 80 have different roles with respect to the system 100. FIG. 3*b* illustrates an example of athletes 82, parents 84, coaches 86, trainers 88, and health care providers 89 interacting with each other subject to the contours of relationships defined by the system.

B. IT Infrastructure

FIG. 4 is an environmental diagram illustrating an example of various IT infrastructure 200 components that can be incorporated into the functionality of the system 100. Users 80 interact with the system 100 through an interface 230 in a client device 212 that is accessible to the user 80. Client devices 212 are often owned by users 80 and used by users 80 for reasons that go beyond the processing by the system 100. Data 400 is exchanged back and forth between the client device 212 and server 216 across a network 290. Data 400 is being created, modified, and communicated between the client device 212 and the server 216 as the system 100. Each computer 210, whether a client device 212 or a server 216, can include a processor 220, run or more applications 240 to perform the functionality of the system 100, a storage component 250 and a database 260 to store data 400.

The system 100 can also be implemented in a substantially stand-alone manner with the client device 212 housing the entire IT infrastructure 200 necessary to perform the functionality of the system 100.

C. Data

The system 100 uses data 400 and the processing of that data 400 to transform a general purpose computer 210 in a common IT infrastructure 200 into a valuable tool for the ongoing development of an athlete 82. Data 400 can be differentiated on the basis of whether it is an input 410 or an output 460, as well as by development category 500 and skill area 550.

1. Development Categories and Skill Areas

FIG. 2*a* is a data hierarchy diagram illustrating an example of how at athlete 82 can be represented in the system 100 as a collection of data 400, that the collection of data 400 can be organized into particular data categories 500, and that data categories 500 can be organized into certain skill areas 550.

FIG. 2*b* is a data hierarchy diagram similar to the illustration in FIG. 2*a*, with specific examples of data categories 500 and skill areas 550 that can be incorporated in to the processing performed by the system 100. In a preferred embodiment of the system 100, the system 100 will be cognizant of the following development categories 500, and those development categories 500 will possess the following skill areas 550:

The performance psychology category 510 will include the skill areas 550 of BSC 562, SPF 564, and MDH 566.

The personal development category 520 will include the skill areas 550 of BSA 572, CSR 574, and ECS 576.

The team leadership category 530 will include the skill areas 550 of LAS 582, ASO 584, and RTP 586.

2. Inputs and Outputs

The system 100 can benefit athletes 82 by providing a continuous or at least repeating loop of soliciting inputs 410, using the inputs 410 to generate outputs 460, and then soliciting subsequent inputs 410 using the recent outputs 460.

As illustrated in a very detailed and specific manner, FIGS. 7k-8y illustrate examples of screens displaying objectives 468, requesting athletes 82 to perform certain exercises 470, and then prompting athletes 82 to submit answers 430 to certain questions 479. Those answers 430 can be scored 474, both in the aggregate and with respect to the specific development categories 500 and skill areas 550. The system 100 can then identify relative strengths and weaknesses of the athlete 82, that can be explored further and improved upon in subsequent iterative loops of the processing performed by the system 100.

FIG. 5a is a data hierarchy diagram illustrating an example of the different inputs 410 that can be used individually or collectively in accordance with the particular program 240 to create one or more outputs 460. The system 100 can be configured to selectively influence the creation of output 460 based on a single input 410, or conversely, through large lists of inputs 410 where even a single different in an input 410 results in a significantly different output 450.

FIG. 5b is an input-output diagram illustrating an example of a system 100 where inputs 410 and outputs 450 include the categories 500 of performance psychology 510, personal development 520, and leadership 530. As illustrated in the Figure, the iterative loop between inputs and outputs can be repeated indefinitely at a frequency set forth by the system 100 and its users 80.

D. Process-Flow

FIG. 6a is a flow chart diagram illustrating an example of an iterative process 900 of assessment and improvement in the development of an athlete 82 utilizing the system 100.

At 910, one or more inputs 410 are received by the system 100.

At 920, those inputs 410 are used by the application 240 implementing the rules of the system 100 to create the applicable outputs 450. As illustrated in FIG. 5a, outputs 450 can include things like a status 462, an assessment 464, a certification 466, an exercise 470, an objective 468, an action plan 472, and a communication 480. As illustrated in FIG. 5b, outputs 450 can be organized into a variety of different categories 500 such as performance psychology 510, personal development 520, and leadership 530. As illustrated in FIG. 2b, the data categories 500 can themselves be organized into sub-categories or skill areas 550, such as BSC 562, SPF 564, MDH 566, BSA 572, CSR 574, ECS 576, LAS 582, ASO 584, and RTP 586.

At 930, the output 460 is generated by the system 100. The output 460 can include various scores 474, a graph 476 of those scores 474, future questions 479 to be asked of the athlete 82, communications 480 to the athlete 82 or other users 80, a selectively identified object 468 for future consideration by the athlete 82, a selectively identified exercise 470 for future action by the athlete 82, the creation or updating of an action plan 472 pertaining to the athlete 82, certifications 466 with respect to certain milestones, and a potential change in the status 462 of the athlete 82.

FIG. 6b differs from FIG. 6b in that the system 100 selectively identifies certain activities, objectives 468, and exercises 470 for the athlete 82 prior to the submission of the first questions 479. FIGS. 7k-8y illustrate examples of screens which first identify objectives 468 and exercises 470 prior to the solicitation of answers 430 by athletes 82.

IV. Interface Views

The system 100 can be implemented using a wide variety of different IT infrastructures 200 ranging from a stand-alone application 230 residing on a smart phone or other mobile device 214 operated by an athlete 82 to develop himself or herself. The system 100 could even be implemented using paper and pencil, with the scores 474 being manually tabulated. On the other end of the implementation continuum, the system 100 can be implemented on the cloud to maximize the ability of different users 80 to interact with each other and to maximize the variety of data 400 and data sources that can be utilized by the system 100. Such an embodiment utilizes one or more servers 216 to host data 400 that can be selectively accessed and influenced by athletes 82, parents 84, coaches 86, trainers 88, providers 89, and potentially other users 80. In such embodiments, the system 100 can integrate with sources of data 400 that pertain to the development of an athlete 82, such as: sensor data 420 captured by sensors 300 during a sporting event; sports statistics 440; observations and feedback from teammates, parents 84, coaches 86, trainers 88, and providers 89; various sources of communications 480; and other information technology applications.

FIGS. 7a-8y represent examples of screens that can be included into an interface 230 through which a user 80 interacts with the system 100.

Figure 7A:
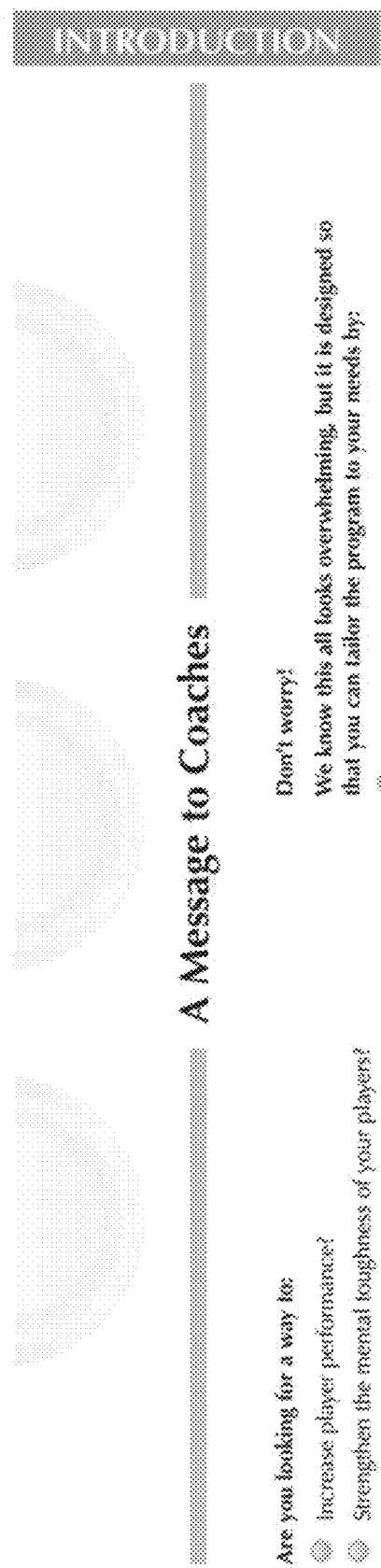

FIG. 7a is an example of a notification and information screen for coaches 86. Different embodiments of the system 100 can utilize different rules for the confidentiality and sharing of information. In some embodiments, the rules for confidentiality and information sharing are dynamic, with different users 80 able to set different parameters. By way of example, one athlete 82 can prevent any other user 80 from accessing personally identifiable information relating to that athlete 82, while another athlete 82 may invite other users 80 to both access and contribute to that athlete's 82 interactions with the system 100, giving parents 84, coaches 86, trainers 88, and even health care providers 89 the ability to interact with the system 100 in ways that can contribute the development of the athlete 82. Different embodiments of the system 100 can also utilize different forms of inputs 410 and outputs 460 that are used to develop athletes 82. In some embodiments of the system 100, such processing can be highly customized, in accordance with the needs and desires of relevant users 80.

FIG. 7b is an example of a notification and information screen for athletes 82. As discussed above, the system 100 can be configured in a wide variety of different ways with respect to the ability to access data 400, and whether other users will be able to access personally identifiable data 400.

Figure 7C:
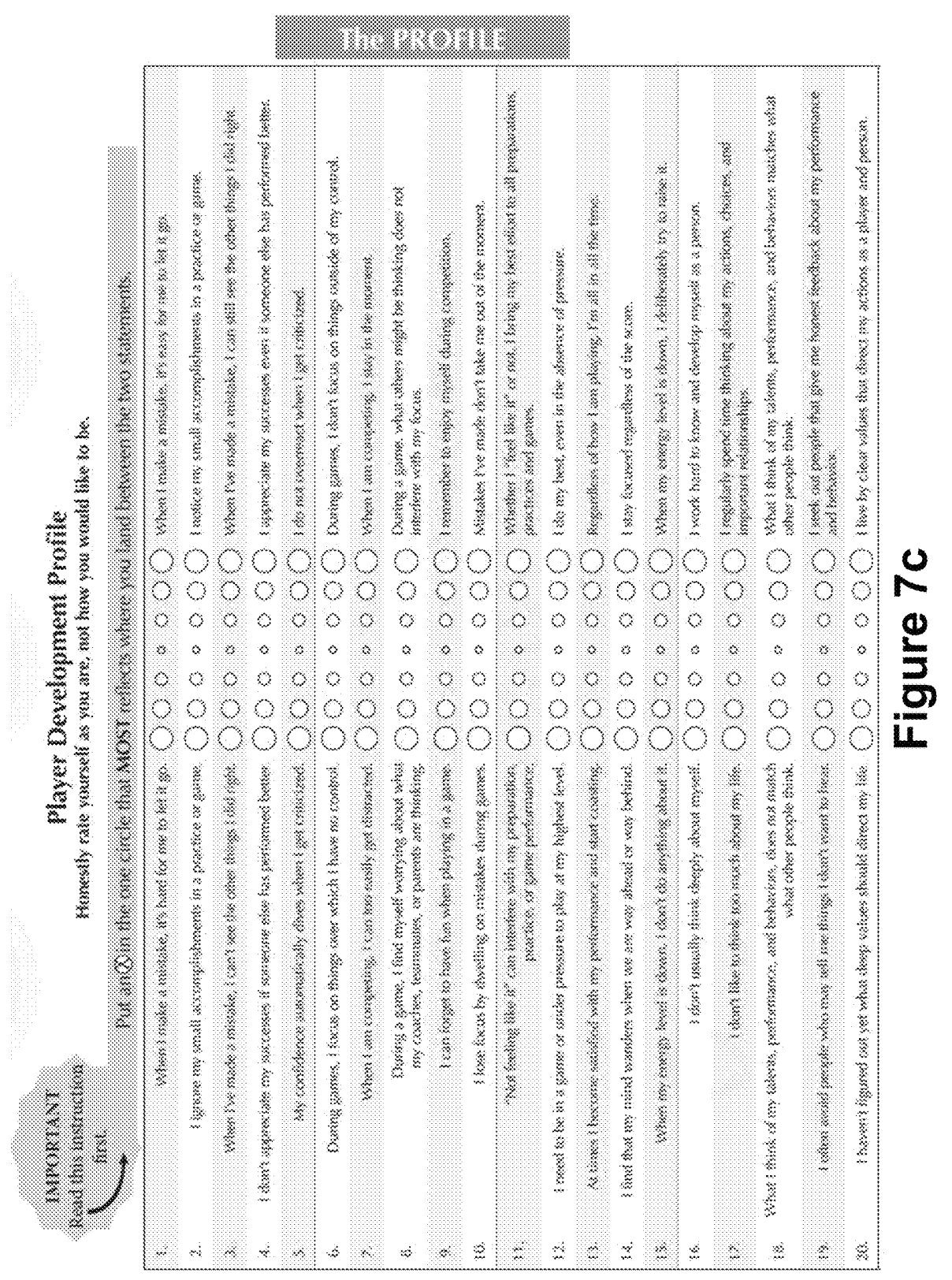

FIG. 7c is an example of a screen for athletes 82 that presents athletes 82 with a questionnaire 478 comprised of multiple-choice questions 479. The athlete 82 can be prompted to provide answers 430 to the questionnaire 478 on a periodic basis, with the system 100 storing each set of answers 430 to create a history 452 for that athlete 82.

Figure 7D:
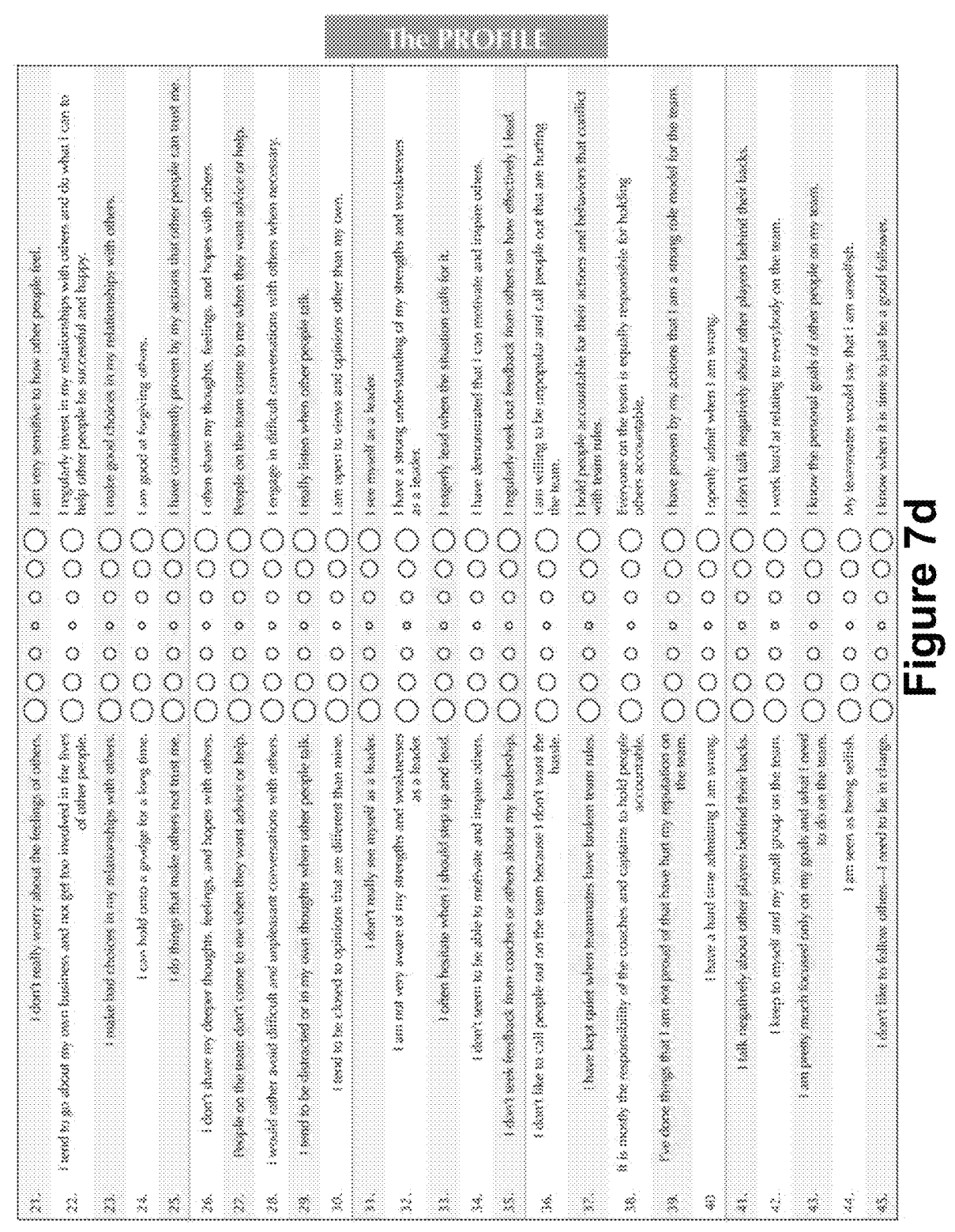

FIG. 7d is an example of a screen for athletes 82 that is similar to the screen illustrated in FIG. 7c.

Figure 7E:
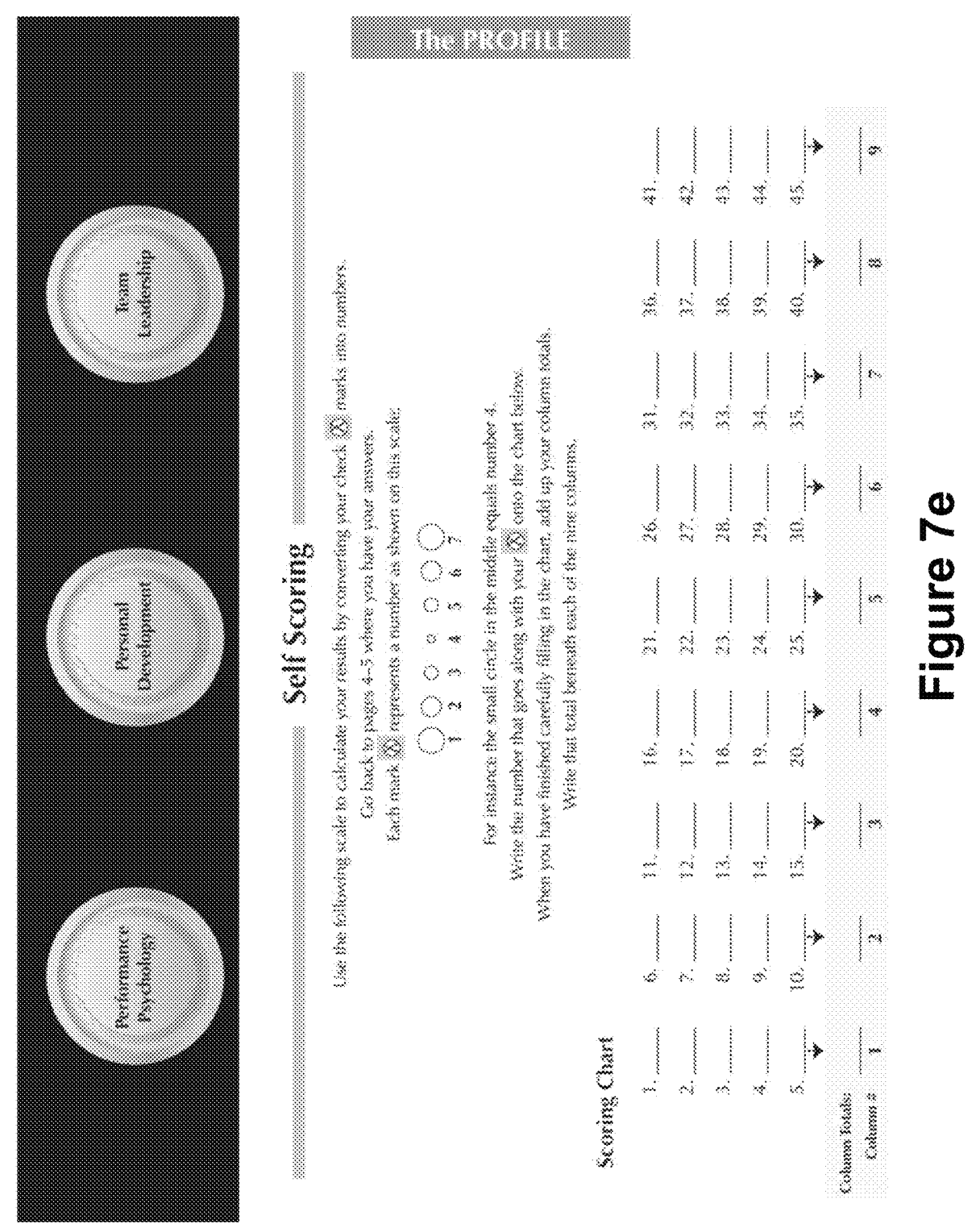

FIG. 7e is an example of a screen that displays the scoring methodology for generating scores 474 to the answers 430 provided in FIGS. 7c and 7d. In some embodiments of the system 100, the scoring can be done in a fully automated and opaque manner to users 80. The embodiment of the system 100 illustrated in FIG. 7e includes column totals to correspond to specific skill areas 550.

Figure 7F:
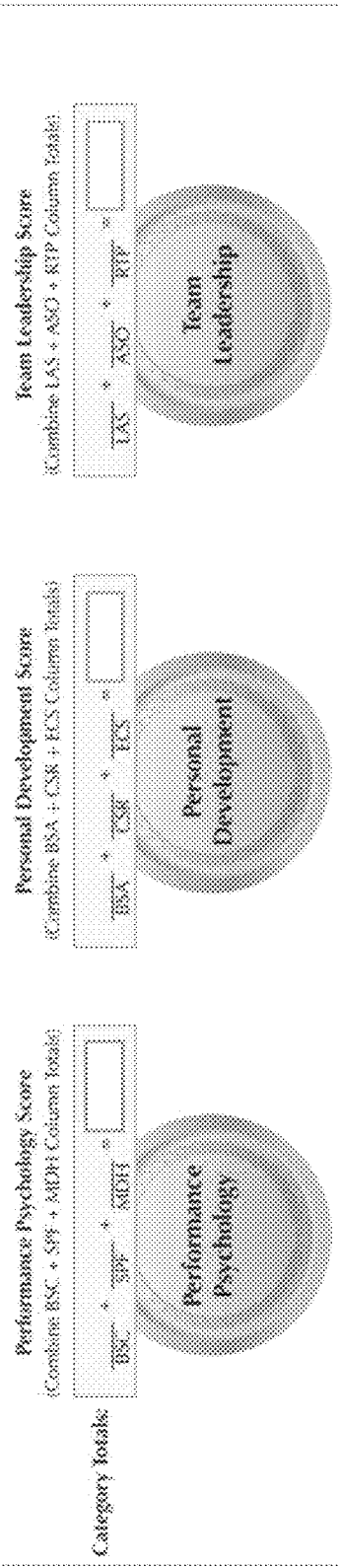
FIG. 7*f* is an example of a screen that further tabulates the scores from FIG. 7*e*. The column totals correspond to the specific skill areas BSC, SPF, MDH, BSA, CSR, ECS, LAS, ASO, and RTP. The screen further shows how the various scores for the various skill areas correspond to scores for three development categories.

FIG. 7f is an example of a screen that further tabulates the scores 474 from FIG. 7e. The column totals correspond to the specific skill areas 550 of BSC 562, SPF 564, MDH 566, BSA 572, CSR 574, ECS 576, LAS 582, ASO 584, and RTP 586. The screen further shows how the various scores 474 for the various skill areas 550 correspond to scores 474 for three development categories 500.

Figure 7G:
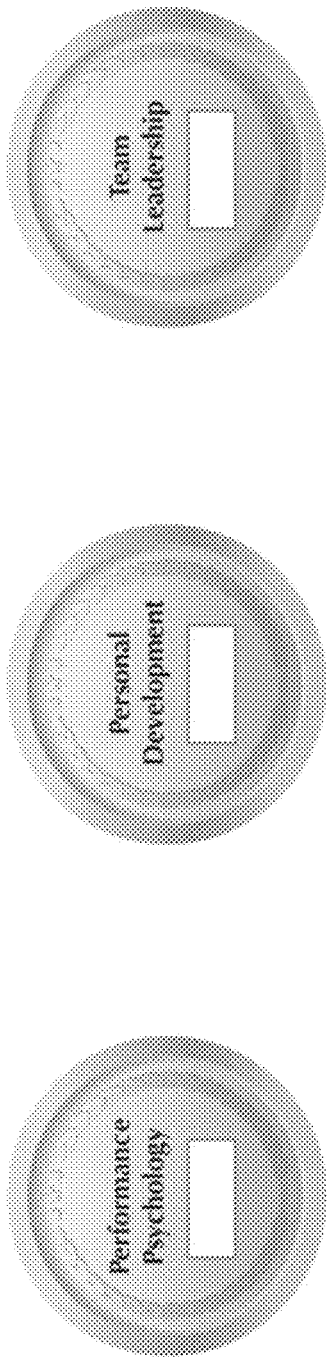
FIG. 7*g* is an example of a screen that further tabulates the scores for the three development categories into an aggregated score.

FIG. 7g is an example of a screen that further tabulates the scores 474 for the three development categories 500 into an aggregated score 474.

Figure 7H:
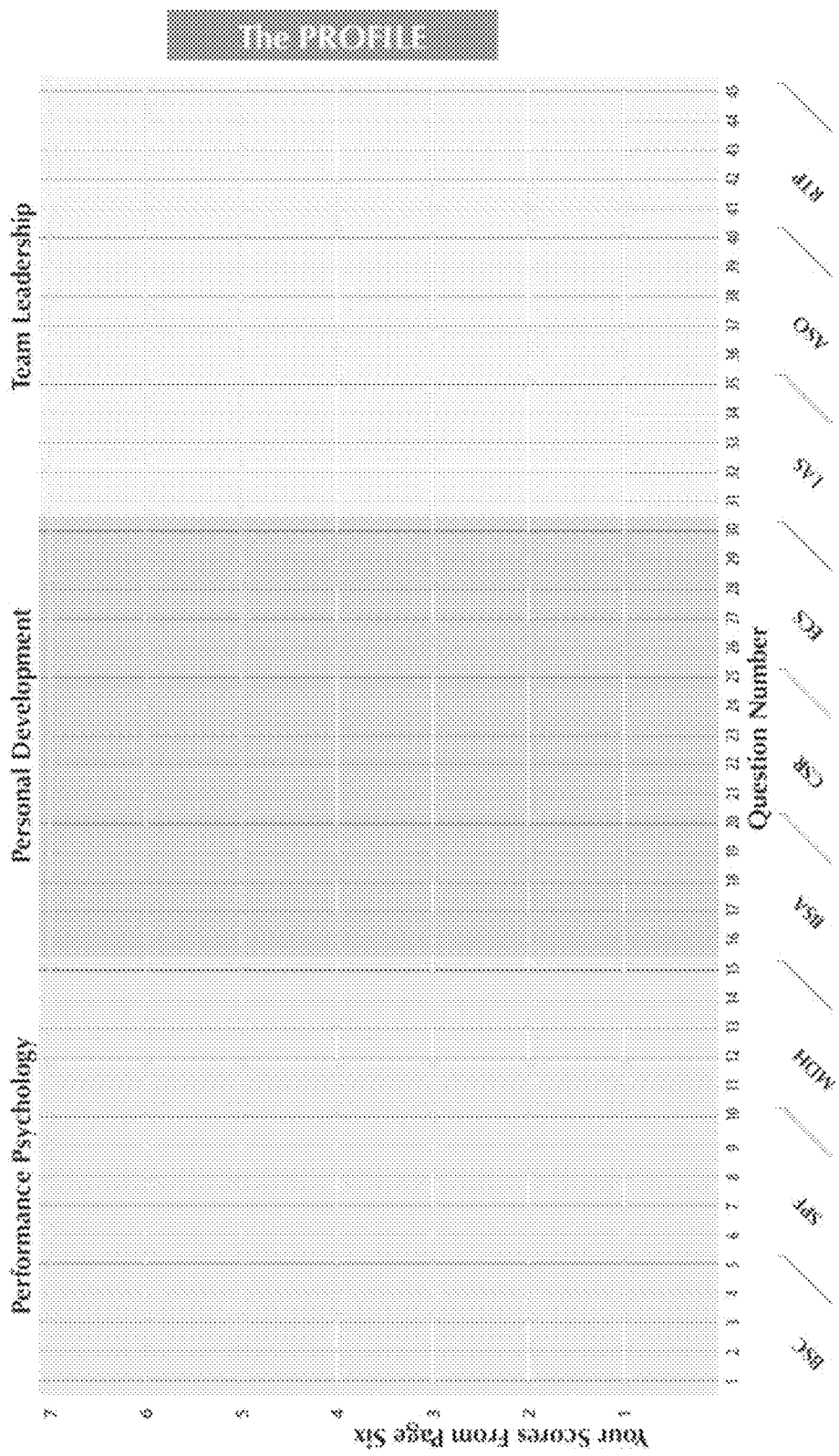
FIG. 7*h* is an example of a screen that can illustrate a graph of the scores.

FIG. 7h is an example of a screen that can illustrate a graph 476 of the scores 474.

FIG. 7i is an example of a screen that can summarize various scores and identify the relative strengths and weaknesses of the athlete 82.

Figure 7J:
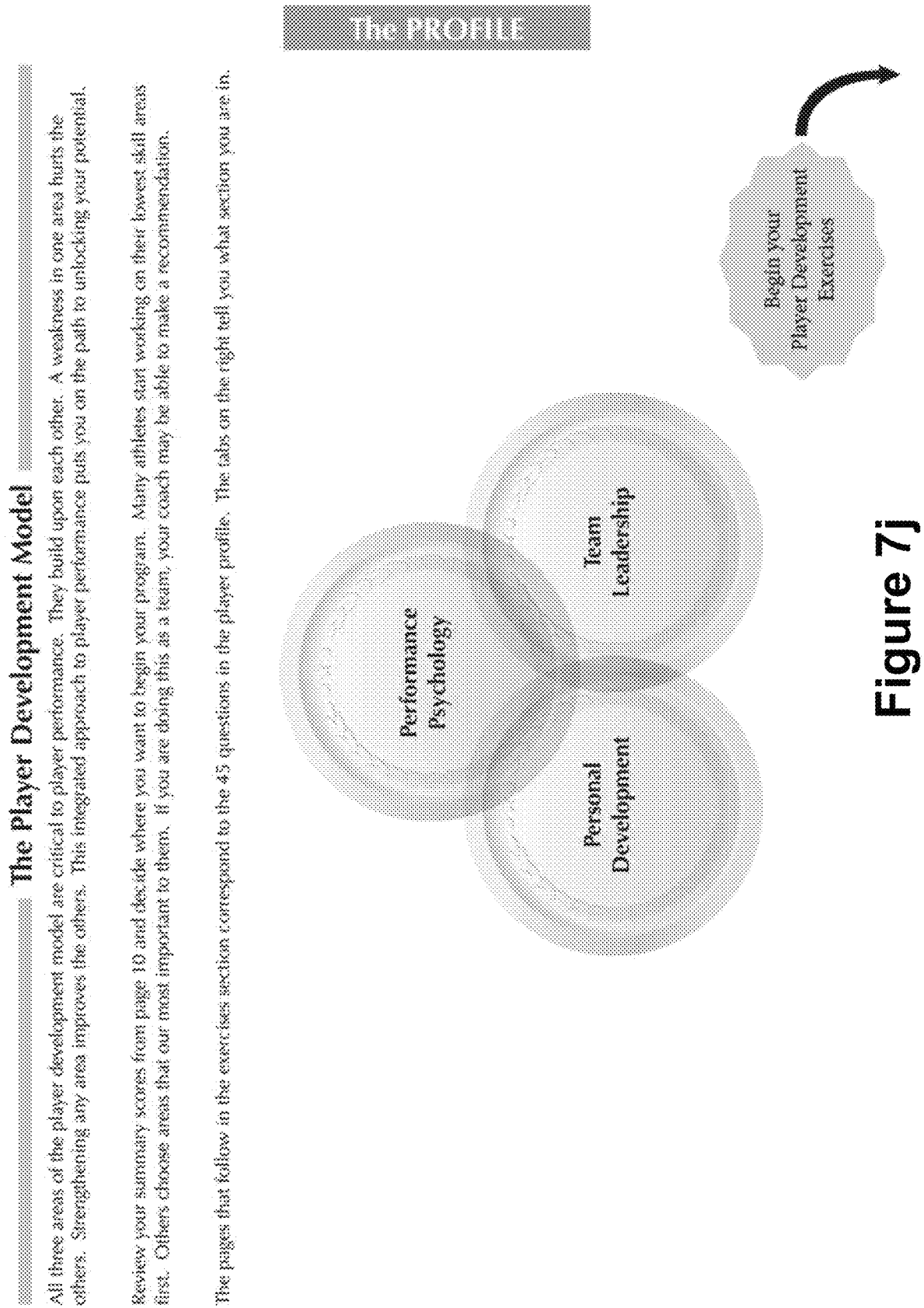
FIG. 7*j* is an example of a screen that explains the relationships between the three development categories.
Figure 8F:
Figure 8U:
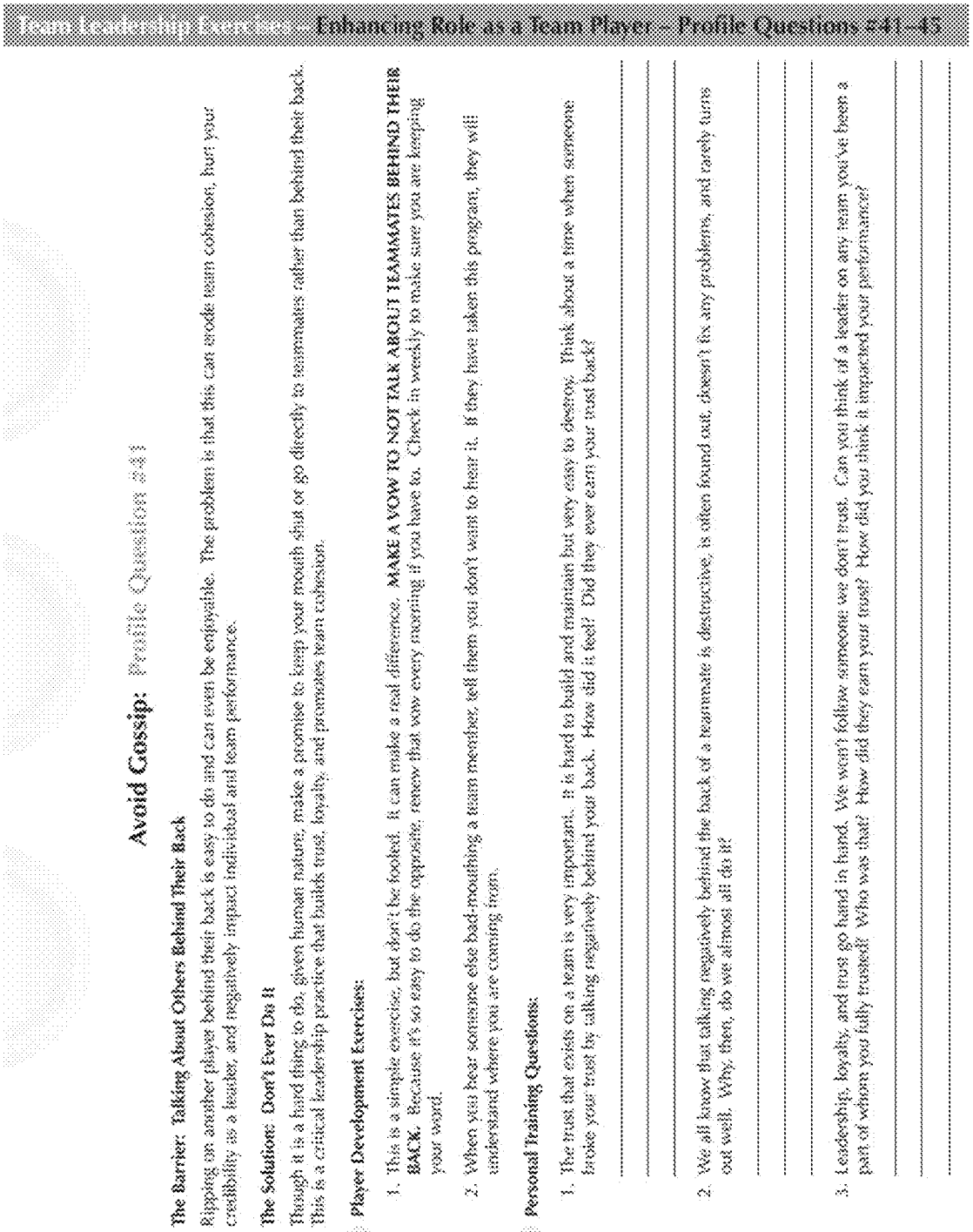

FIG. 7j is an example of a screen that explains the relationships between the three development categories 500.

FIGS. 7k-7o are examples of screens that explain certain objectives 468, communicate certain exercises 470 to the user 80, and submits certain questions 479 to the user 80 for which the user 80 can provide answers 430. FIGS. 7k-7o relate to the skill area 550 of BSC 562 and the development category of performance psychology 510.

FIGS. 7p-7s are examples of screens that explain certain objectives 468, communicate certain exercises 470 to the user 80, and submits certain questions 479 to the user 80 for which the user 80 can provide answers 430. FIGS. 7p-7s relate to the skill area 550 of SPF 564 and the development category of performance psychology 510.

FIGS. 7t-7x are examples of screens that explain certain objectives 468, communicate certain exercises 470 to the user 80, and submits certain questions 479 to the user 80 for which the user 80 can provide answers 430. FIGS. 7t-7x relate to the skill area 550 of MDH 566 and the development category of performance psychology 510.

FIGS. 7y-8b are examples of screens that explain certain objectives 468, communicate certain exercises 470 to the user 80, and submits certain questions 479 to the user 80 for which the user 80 can provide answers 430. FIGS. 7y-8b relate to the skill area 550 of BSA 572 and the development category of personal development 520.

FIGS. 8c-8f are examples of screens that explain certain objectives 468, communicate certain exercises 470 to the user 80, and submits certain questions 479 to the user 80 for which the user 80 can provide answers 430. FIGS. 8c-8f relate to the skill area 550 of CSR 574 and the development category of personal development 520.

FIGS. 8g-8l are examples of screens that explain certain objectives 468, communicate certain exercises 470 to the user 80, and submits certain questions 479 to the user 80 for which the user 80 can provide answers 430. FIGS. 8g-8l relate to the skill area 550 of ECS 576 and the development category of personal development 520.

FIGS. 8m-8p are examples of screens that explain certain objectives 468, communicate certain exercises 470 to the user 80, and submits certain questions 479 to the user 80 for which the user 80 can provide answers 430. FIGS. 8m-8p relate to the skill area 550 of LAS 582 and the development category of team leadership 530.

FIGS. 8q-8t are examples of screens that explain certain objectives 468, communicate certain exercises 470 to the user 80, and submits certain questions 479 to the user 80 for which the user 80 can provide answers 430. FIGS. 8q-8t relate to the skill area 550 of ASO 584 and the development category of team leadership 530.

FIGS. 8r-8t are examples of screens that explain certain objectives 468, communicate certain exercises 470 to the user 80, and submits certain questions 479 to the user 80 for which the user 80 can provide answers 430. FIGS. 8q-8t relate to the skill area 550 of ASO 584 and the development category of team leadership 530.

FIGS. 8u-8y are examples of screens that explain certain objectives 468, communicate certain exercises 470 to the user 80, and submits certain questions 479 to the user 80 for which the user 80 can provide answers 430. FIGS. 8u-8y relate to the skill area 550 of RTP 586 and the development category of team leadership 530.

V. Alternative Embodiments

Different examples of various attributes, components, and configurations that can be incorporated into system 100 are illustrated in the drawings described briefly below. No patent application can expressly disclose in words or in drawings, all of the potential embodiments of an invention. In accordance with the provisions of the patent statutes, the principles, functions, and modes of operation of the apparatus are illustrated in certain preferred embodiments. However, it must be understood that the system 100 may be practiced otherwise than is specifically illustrated without departing from its spirit or scope.

The invention claimed is:

1. A system for developing an athlete, said system comprising:
a first computer that includes a first processor for running a first application, said first application providing a first interface, wherein said first interface is adapted to collect a first plurality of inputs relating to the athlete from the athlete, wherein said first application is adapted to selectively generate a first plurality of outputs from said first plurality of inputs, and wherein said first interface is adapted to display said first plurality of outputs;
wherein said first plurality of outputs include a plurality of development categories, and wherein said plurality of development categories include a performance psychology category, a personal development category, and a team leadership category.

2. The system of claim 1, wherein said plurality of development categories include a plurality of skill areas.

3. The system of claim 2, wherein said plurality of skill areas include a building self confidence, a strengthening performance focus, a making mental discipline a habit, a building self awareness, a creating strong relationships, a practice effective communication skills, an expanding leadership awareness and skills, a strengthening accountability to self and others, and an enhancing my role as a team player.

4. The system of claim 3, wherein said first plurality of outputs include a first plurality of scores.

5. The system of claim 4, wherein said first plurality of scores includes a first score for each said skill area.

6. The system of claim 5, wherein said first plurality of scores includes a first score for each said data category.

7. The system of claim 6, wherein said application is adapted to generate a second plurality of outputs that include a second plurality of scores from a second plurality of inputs received after a predefined period of time after said first plurality of inputs.

8. The system of claim 1, wherein said first plurality of inputs include a subset of inputs received from a second interface on a second computer from a second user.

9. The system of claim 1, wherein said first plurality of inputs include a self-assessment received from the athlete, a sports statistic relating to the athlete a profile pertaining to the athlete, and a history relating to the athlete.

10. The system of claim 1, wherein said first plurality of outputs include a status, a score, an action plan, and a certification.

11. The system of claim 1, wherein a coach uses a second computer to monitor multiple pluralities of outputs pertaining to a plurality of athletes.

12. The system of claim 11, wherein said second computer includes a second interface displaying a plurality of graphs relating to the scores relating to the plurality of athletes over the course of a season.

13. A system for developing an athlete, said system comprising:
    a plurality of computers connected by network, said plurality of computers including a mobile device used by the athlete and a server;
    wherein said mobile device includes a first processor for running a first application, said first application providing a first interface, wherein said first interface is adapted to collect a first plurality of inputs relating to the athlete from the athlete, wherein said first application is adapted to selectively generate a first plurality of outputs from said first plurality of inputs, and wherein said first interface is adapted to display said first plurality of outputs;
    wherein said first plurality of outputs include a plurality of categories, wherein said plurality of categories include a performance psychology category, a personal development category, and a team leadership category.

14. The system of claim 13, wherein said first plurality of outputs is selectively influenced by a database residing on said server.

15. The system of claim 13, wherein said first plurality of outputs is selectively influenced by a third computer operated by a parent.

16. The system of claim 13, wherein said first plurality of outputs is selectively influenced by a third computer operated by a coach.

17. The system of claim 13, wherein said plurality of development categories (500) include a plurality of skill areas, wherein said performance psychology category includes a building self confidence, a strengthening performance focus, and a making mental discipline a habit BSC, wherein said personal development category includes a building self awareness, a creating strong relationships, a practice effective communication skills, and wherein said team leadership category includes an expanding leadership awareness and skills, a strengthening accountability to self and others, and an enhancing my role as a team player.

18. A method for developing an athlete, said method comprising:
    selectively identifying a first plurality of exercises from a database that is accessible from a mobile device under the control of the athlete;
    selectively displaying the first plurality of identified exercises on an interface residing on the mobile device;
    selectively identifying a first plurality of questions from a database that are accessible from the mobile device;
    selectively displaying the first plurality of questions on the interface residing on the mobile device;
    receiving a first plurality of answers from the athlete through the interface residing on the mobile device;
    selectively identifying a second plurality of exercises from the database;
    selectively displaying the second plurality of identified exercises on an interface residing on the mobile device;
    selectively identifying a second plurality of questions from a database that are accessible from the mobile device;
    selectively displaying the second plurality of questions on the interface residing on the mobile device;
    receiving a second plurality of answers from the athlete through the interface residing on the mobile device;
    selectively identifying a third plurality of exercises from the database;
    selectively displaying the third plurality of identified exercises on an interface residing on the mobile device;
    selectively identifying a third plurality of questions from a database that are accessible from the mobile device;
    selectively displaying the third plurality of questions on the interface residing on the mobile device;
    receiving a third plurality of answers from the athlete through the interface residing on the mobile device; and
    calculating a plurality of scores from said first plurality of answers, said second plurality of answers, and said third plurality of answers, wherein said plurality of scores relating to a plurality of skill areas and wherein each skill area relates to a development category;
    wherein said plurality of development categories include a performance psychology category, a personal development category, and a team leadership category;
    wherein said plurality of skill areas include a building self confidence, a strengthening performance focus, a making mental discipline a habit, a building self awareness, a creating strong relationships, a practice effective communication skills, an expanding leadership awareness and skills, a strengthening accountability to self and others, and an enhancing my role as a team player; and
    wherein the performance psychology category includes the building self confidence, the strengthening performance focus, and the making mental discipline a habit, wherein the personal development category includes the building self confidence, the strengthening performance focus, and the making mental discipline a habit, and wherein the team leadership category includes an expanding leadership awareness and skills, a strengthening accountability to self and others, and an enhancing my role as a team player.

* * * * *